US012576409B2

(12) United States Patent
Cheng et al.

(10) Patent No.: US 12,576,409 B2
(45) Date of Patent: Mar. 17, 2026

(54) PARTICULATE COLLECTING DEVICE

(71) Applicant: The Tyre Collective Ltd, London (GB)

(72) Inventors: Ching Ping Hanson Cheng, London (GB); Hugo Richardson, London (GB); Siobhan Louise Anderson, London (GB); Manjeshwar Deepak Mallya, London (GB)

(73) Assignee: The Tyre Collective Ltd, London (GB)

( * ) Notice: Subject to any disclaimer, the term of this patent is extended or adjusted under 35 U.S.C. 154(b) by 664 days.

(21) Appl. No.: 17/796,403

(22) PCT Filed: Jan. 29, 2021

(86) PCT No.: PCT/GB2021/050218
§ 371 (c)(1),
(2) Date: Jul. 29, 2022

(87) PCT Pub. No.: WO2021/152331
PCT Pub. Date: Aug. 5, 2021

(65) Prior Publication Data
US 2023/0338969 A1 Oct. 26, 2023

(30) Foreign Application Priority Data

Jan. 29, 2020 (GB) ..................................... 2001254

(51) Int. Cl.
| | |
|---|---|
| *B03C 3/45* | (2006.01) |
| *B03C 3/74* | (2006.01) |
| *F16D 65/00* | (2006.01) |

(52) U.S. Cl.
CPC ................ *B03C 3/45* (2013.01); *B03C 3/743* (2013.01); *F16D 65/0031* (2013.01); *B03C 2201/30* (2013.01)

(58) Field of Classification Search
CPC ..... F16D 65/0031; B60H 3/0071; B60C 9/00; B60W 40/12; B62D 25/18; B03C 3/011;
(Continued)

(56) References Cited

U.S. PATENT DOCUMENTS

| | | | |
|---|---|---|---|
| 6,152,988 | A | 11/2000 | Plaks et al. |
| 8,701,844 | B2 | 4/2014 | Tsiberidis |

(Continued)

FOREIGN PATENT DOCUMENTS

| | | |
|---|---|---|
| CN | 106994391 A | 8/2017 |
| CN | 109790889 A1 | 12/2021 |

(Continued)

OTHER PUBLICATIONS

Search Report issued in Patent Application No. GB2001254.8 on Jun. 17, 2020.

(Continued)

*Primary Examiner* — Jennifer Dieterle
*Assistant Examiner* — Sonji Turner
(74) *Attorney, Agent, or Firm* — Brian J. Colandreo; Jeffrey T. Placker; Holland & Knight LLP

(57) ABSTRACT

A particulate collecting device (100) attachable to a vehicle for collecting or capturing particulates that are released from a tyre or a wheel (W) of the vehicle through wear on or against a driving surface (S) when the vehicle is driven on the driving surface. The device comprises an electrostatic filter unit (110) mountable in an operative position in close proximity to the tyre or the wheel of the vehicle for receiving a flow of particulates (FI) from a contact point (CP) between the tyre or wheel and the driving surface. The filter unit (110) is configured to collect or capture the particulates in the flow by electrostatic attraction.

19 Claims, 18 Drawing Sheets

(58) Field of Classification Search
CPC .......... B03C 3/019; B03C 3/025; B03C 3/04;
B03C 3/06; B03C 3/08; B03C 3/10;
B03C 3/12; B03C 3/15; B03C 3/32;
B03C 3/41; B03C 3/45; B03C 3/47;
B03C 3/49; B03C 3/64; B03C 3/68;
B03C 3/743; B03C 3/76; B03C 3/78;
B03C 3/145; B03C 3/155; B03C 2201/24;
B03C 2201/30; B03C 2201/32
See application file for complete search history.

(56) References Cited

U.S. PATENT DOCUMENTS

| | | | | |
|---|---|---|---|---|
| 11,992,847 | B2 * | 5/2024 | Lange ..................... | B60R 19/00 |
| 2002/0166311 | A1 * | 11/2002 | Maricq ..................... | B03C 1/23 |
| | | | | 55/385.3 |
| 2005/0000197 | A1 * | 1/2005 | Krantz ................. | B03C 1/0332 |
| | | | | 55/385.3 |
| 2008/0029357 | A1 * | 2/2008 | Krantz ............... | B60L 15/2036 |
| | | | | 219/202 |
| 2009/0265880 | A1 * | 10/2009 | Jessberger ........... | B60T 17/221 |
| | | | | 15/347 |
| 2011/0214568 | A1 * | 9/2011 | Krantz ............... | F16D 65/0031 |
| | | | | 55/385.3 |
| 2014/0054121 | A1 | 2/2014 | Hummel et al. | |
| 2014/0262633 | A1 * | 9/2014 | Kunzler ................... | B03C 3/41 |
| | | | | 188/73.31 |
| 2017/0210354 | A1 * | 7/2017 | Mathissen ................ | B03C 3/00 |
| 2020/0331005 | A1 * | 10/2020 | You .......................... | B03C 3/47 |

FOREIGN PATENT DOCUMENTS

| | | |
|---|---|---|
| DE | 202008009717 U1 | 12/2009 |
| EP | 0757923 A1 | 2/1997 |
| EP | 1256739 | 11/2002 |
| JP | 59192675 A | 4/1983 |
| JP | 2001062344 A | 3/2001 |
| JP | 2006526088 A | 11/2006 |
| KR | 101511663 A1 | 4/2015 |
| KR | 20150082110 A1 | 7/2015 |
| WO | 2015199412 A1 | 12/2015 |
| WO | 2019139353 A1 | 1/2019 |
| WO | 2021/152331 A1 | 8/2021 |

OTHER PUBLICATIONS

International Search Report and Written Opinion issued in PCT/GB2021/050218 on Apr. 1, 2021.

* cited by examiner

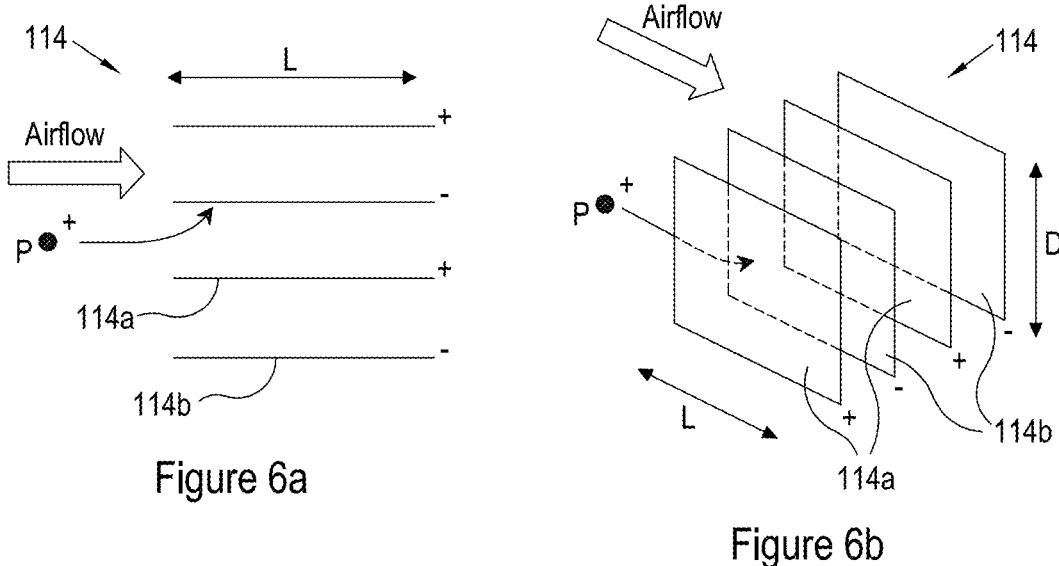
Figure 6a
Figure 6b
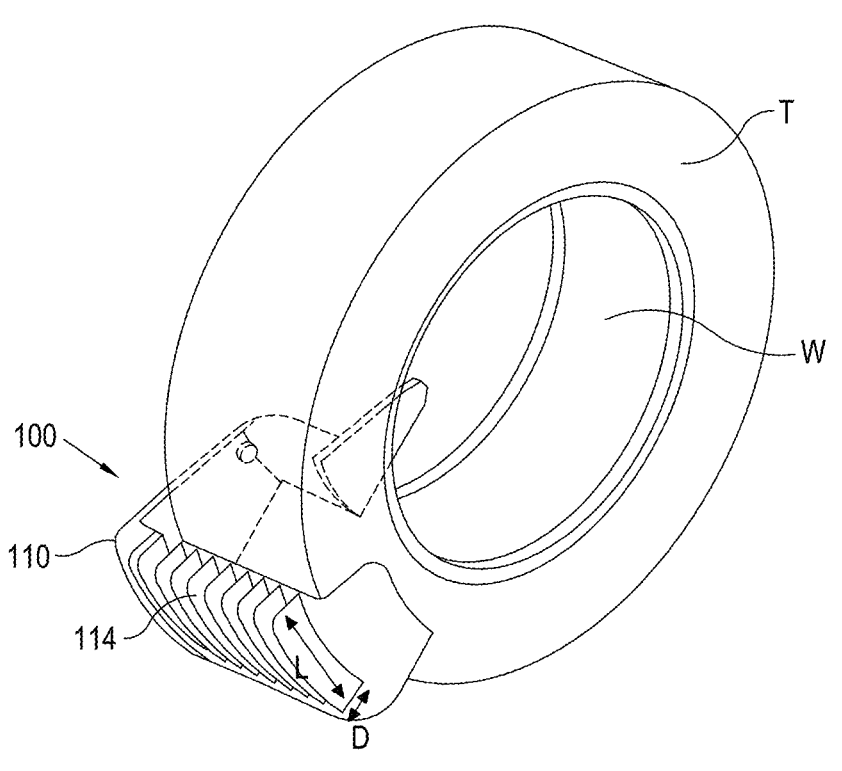
Figure 7

PARTICULATE COLLECTING DEVICE

CROSS-REFERENCE TO RELATED APPLICATIONS

This application is a U.S. National Stage of International Patent Application No. PCT/GB2021/050218/, filed 29 Jan. 2021, which claims the benefit of Great Britain Patent Application No. 2001254.8, filed on 29 Jan. 2020. The disclosures of which are incorporated herein by reference in their entirety.

TECHNICAL FIELD

This invention relates to a particulate collecting device for capturing or collecting particulates, particularly but not exclusively, that are released from a tyre or wheel of a vehicle through wear on or against a driving surface on which vehicle is driven, to prevent or reduce their release into the environment and associated pollution.

BACKGROUND TO THE INVENTION

Modern vehicle tyres are composed of rubber and plastic-based/petrochemical-based compounds that wear against the road surface as the vehicle is driven, producing small tyre particulates often referred to as "tyre dust". Most of the tyre dust collects on or at the sides of roads where it can get washed into drains or waterways, but some of the tyre particles are small enough to become airborne, be inhaled and contribute to air pollution.

Today, there are half a million tons of tyre particles produced in Europe annually from wear and tear against the road surface. In fact, tyre dust is the second largest microplastic pollutant in our environment. Of particular concern to human and animal health are PM2.5 levels in the air, particles less than 2.5 μm in diameter that stay longer in the air than larger particulates and have an increased risk of inhalation, that have been linked to heart and lung disease. Tyre dust contributes almost 10% by mass of PM2.5 levels in the UK. Added to this, carbon black, which accounts for up to 30% of modern tyre compositions, is a known carcinogenic.

Rail vehicles such as trains and trams also produce small metal particulate emissions from frictional wear of the rail wheels against the metal tracks which contributes (albeit to a lesser extent) to pollution, particularly to air pollution in underground settings.

While there have been significant efforts in recent years to reduce exhaust emissions from vehicles such as cars and trains through the development of cleaner engine technologies, emissions from non-exhaust sources such as tyre and wheel particulates have not been addressed and will continue to increase with number of vehicles in circulation, particularly with new vehicles including more and more technology and becoming heavier than the ones they replace. There are currently no policies in place to control these emissions.

Pollution from tyre and wheel particulates is therefore a growing concern for both public health and the environment, and there is a need to find innovative ways to reduce these emissions.

Aspects and embodiments of the present invention have been devised with the foregoing in mind.

SUMMARY OF THE INVENTION

According to a first aspect of the invention there is provided a particulate collecting device. The device may be attachable to a vehicle for collecting or capturing particulates that are released from a tyre or a wheel of the vehicle through wear on or against a driving surface when the vehicle is driven on the driving surface. The device may be attachable in a position in the vicinity of the wheel or tyre. The device may comprise an electrostatic filter unit for collecting or capturing the particulates by electrostatic attraction. The electrostatic filter unit may be mountable in an operative position relative to the wheel of the vehicle for receiving a flow of particulates from a contact point (or contact area) between the tyre or wheel and the driving surface. The operative position may be in close proximity to the tyre or the wheel. The filter unit may be configured to collect or capture the particulates in the flow by electrostatic attraction. The filter unit may be configured to collect or capture charged particulates in the flow. The electrostatic filter unit may comprise one or more electrostatically chargeable collector electrodes for attracting the particulates (in the flow) to the or each collector electrode when charged to collect or capture the particulates.

Tyre or wheel wear occurs at the contact point between the tyre T or wheel W and the driving surface S. The device advantageously collects or captures particulate emissions at their source to prevent them entering the environment. Once collected, these particulates can be disposed of in a controlled manner or recycled.

The vehicle may be a wheeled vehicle. The vehicle may be a tyre-fitted vehicle, where the wheels are fitted with tyres, or a non-tyre fitted vehicle where the wheels are not fitted with tyres. Non-limiting examples of a tyre-fitted vehicle include a car, truck, bus, heavy goods vehicle (HGV), motorcycle, scooter, bicycle or aircraft. Non-limiting examples of a non-tyre-fitted vehicle include rail vehicles, such as a train or tram. Where the vehicle is a tyre-fitted vehicle the particulates are tyre particulates released from the tyre of the wheel through wear on or against the driving surface. The tyre particulates may be or comprise rubber, plastics, and/or petrochemical-based particulates or a rubber, plastics, and/or petrochemical-based compound. Where the vehicle is a non-tyre-fitted vehicle the particulates may comprise metal particulates.

The filter unit may be or comprise a collection stage for collecting charged particulates. The collection stage may comprise the collector electrode(s). In an embodiment, the filter unit does not include a charging stage for charging particulates. Particulates produced through tyre and/or wheel wear on or against the driving surface may be charged, e.g. through friction at the contact point. The absence of a charging stage means the device may consume/require less electric power when operating/to operate and can be more compact in size relative to the vehicle wheel than electrostatic filter units that comprise a charging and collection stage.

The operative position may be such that the filter unit is positioned in close proximity to a radially outer surface of the tyre or wheel, and/or to the contact point (or contact area) between the tyre or wheel and the driving surface. This may increase or maximise the proportion, quantity, and/or flow of particulates that can enter the filter unit and be collected.

The operative position of the filter unit may include a minimum distance from the driving surface S (e.g. a driving surface or ground clearance), and a minimum distance from a radial outer surface of the tyre or wheel (e.g. a tyre or wheel clearance). This may avoid contact between the filter unit and the driving surface S and tyre or wheel in use. The minimum distance from the driving surface S may be in the range of substantially 10-500 mm, or 10-200 mm, or 10-50, 50-100, 100-150, 150-200, 200-250, 250-300, 300-350, 350-400, 400-450, or 450-500 cm, or any combination or sub-combination of these ranges. The minimum distance from the radial outer surface of the tyre or wheel may be in the range of substantially 10-200 mm, or 10-20, 20-30, 40-50, 50-60, 60-70, 70-80, 80-90, 90-100, 100-110, 110-120, 120-130, 130-140, 140-150, 160-170, 170-180, 180-190, or 190-200 mm, or any combination or sub-combination of these ranges.

The operative position may be behind the wheel (relative to the direction of forward motion of the vehicle). This may allow the device to collect particulates that are emitted or projected from the contact point in the rearward direction, e.g. produced during vehicle acceleration.

Alternatively, the operative position may be in front of the wheel (relative to the direction of forward motion of the vehicle). This may allow the device to collect particulates that are emitted or projected in the forward direction, e.g. produced during vehicle braking.

Where the operative position is behind the wheel, the filter unit may be mountable in an operative position, or arranged, to receive an airflow around the tyre or wheel containing said particulates entrained therein. This may enable the filter unit to receive a greater quantity of smaller sized particulates compared to operative positions that do not utilise airflows around the tyre or wheel.

The filter unit may be mountable in an operative position, or arranged, to receive a substantially upwardly directed airflow around the tyre or wheel produced from the Magnus effect of the rotating/spinning tyre or wheel (in use, when the vehicle is moving on the driving surface). This airflow may be directed around the back of the tyre or wheel from the contact point, e.g. in the direction of rotation of the wheel or tyre. This airflow may carry, direct and/or draw the majority of particulates from the contact point around at least a portion of the tyre or wheel towards the filter unit. This may allow the filter unit to be positioned further away from the driving surface (and optionally the tyre or wheel) while still receiving a greater quantity of smaller sized particulates than operative positions that do not utilise airflows around the tyre or wheel. Utilising this airflow may also allow the filter unit to be compact in size relative to the wheel.

The device may comprise an attachment portion configured to attach the device to the vehicle (directly or indirectly) and mount the filter unit in the operative position. The attachment portion may be configured to attach the device to the vehicle at a mounting point. The mounting point may be such that the operative position of the filter unit is substantially fixed axially and radially relative to the wheel or rotational axis of the wheel. This may allow the filter unit to move with the wheel of the vehicle whilst maintaining the operative position (e.g. as the wheel moves up, down and/or turns). That is, the filter unit is fixed axially and in the plane of the wheel and in a fixed angular position, allowing the wheel to rotate relative to the vehicle when rolling and turning.

The attachment portion may be configured to attach the device to the vehicle at a mounting point on the wheel assembly of the vehicle such that the filter unit is able to move with the wheel whilst maintaining the operative position. Optionally or preferably, where the wheel assembly is or comprises a suspension and/or a steering assembly, the attachment portion may be configured to attach the device to the vehicle at a mounting point on the wheel assembly such that the filter unit is able to move with the vehicle suspension and/or when the wheel is turning whilst maintaining the operative position. The mounting point may be a knuckle or steering knuckle of a vehicle suspension system or wheel assembly.

Alternatively, the attachment portion may be configured to attach the device to the vehicle at a mounting point such that the operative position of the filter unit is not substantially fixed relative to the wheel. That is, the filter unit is not fixed axially and/or in the plane of the wheel, but is substantially fixed relative to the vehicle so that the wheel can turn or move up/down independently from the filter unit. In this case, the mounting point may be on and/or in a wheel arch of the vehicle, and/or on the underside of the vehicle or vehicle body, and/or at or on an accessory such as a mud flap/guard or trim that is attached to the vehicle or vehicle body.

The attachment portion may be substantially flexible and/or comprise one or more flexible portions or joints to accommodate temporary displacement of the filter unit from the operative position. Optionally or preferably, the attachment portion may be configured to bias the filter unit to/towards the operative position. This may maintain the filter unit in the operative position and return it to the operative position after a displacement from the operative position. The or each flexible joint may be or comprise a spring loaded joint and/or comprise a resiliently flexible member or any other biasing means known the art to impart a returning force to the filter unit when the filter unit is displaced from the operative position. The one or more flexible portions or joints may include suspension, a pneumatic element, or a geared motor. The attachment portion may comprise one or more resiliently flexible portions formed of or comprising a resiliently flexible material, such as a rubber or plastics-based material.

The filter unit may comprise a filter cavity for housing the one or more collector electrodes. The filter cavity may comprise an inlet opening for receiving the flow of particulates or airflow containing the particulates entrained therein. The inlet opening may be configured to face, at least in part, the tyre or wheel when in the operative position. The inlet opening may extend substantially across the width of the tyre or wheel. This may increase the quantity of particulates that the filter unit receives. The inlet opening may extend substantially across at least 60, 70, 80, 90, or 95% of the width of the tyre or wheel. The inlet opening may extend across the entire width or the majority of the width of the tyre or wheel. The inlet opening may extend further than the width of the tyre or wheel. The inlet opening may comprise a circumferential portion that extends in a substantially circumferential direction and/or a radial portion that extends in a substantially radial direction (relative to the wheel). This may to increase the flow or airflow or cross-section of the flow/airflow entering the filter unit.

The inlet opening may comprise or be connected to a nozzle or nozzle portion. The nozzle portion may have an opening with a tapered width in the direction of airflow into the device. The tapered opening may reduce in width in the direction of airflow into the device. The nozzle portion may increase the velocity of airflow into the device, creating a region of low pressure within the device which may thereby increase the entrainment and quantity of tyre particulates entering the device.

Alternatively, the device may comprise a nozzle. The nozzle may be configured to receive a flow of particulates from a contact point (or contact area) between the tyre or wheel and the driving surface and direct the airflow into the inlet opening of the filter unit. The nozzle may have an opening with a tapered width in the direction of airflow into the device, so as to increase the velocity of airflow into the inlet opening of the filter unit. The attachment portion may be configured to attach the filter unit to the vehicle (directly or indirectly) in the operative position. The nozzle may also comprise an attachment portion configured to attach the nozzle to the vehicle at a mounting point. The attachment portion of the filter unit may be configured to attach the filter to a fixed mounting point on the vehicle, such as the underside of the vehicle. The attachment portion of the nozzle may be configured to attach the nozzle to a steering knuckle of a wheel, such that the nozzle can move and rotate freely with the wheel. The attachment portion of the nozzle may be or comprise a flexible rubber joint. The nozzle may be physically separated from the inlet opening, or connected via a flexible conduit.

The tapered opening of the nozzle or nozzle portion may have a linear, polynomial, or exponential profile. The tapered opening of the nozzle or nozzle portion may comprise a fractal pattern or dimension.

The device may comprise a filter mesh positioned across the inlet opening (downstream of the nozzle, where present) or between the inlet opening and the collector electrodes for inhibiting ingress of particulates larger than a threshold size. The mesh may be part of the filter unit. The mesh may comprise a plurality of apertures with a predefined size. The apertures may have a size configured to permit tyre particulates with a size less than the threshold size to enter the device and inhibit larger particulates from entering the device. The mesh may act as a barrier to prevent large contaminants, such as tarmac and gravel, from entering the device. The mesh may also act as a barrier to reduce the amount of water entering the device. The aperture size may further be greater than a threshold size so as not throttle or restrict airflow into the device.

The nozzle may be positioned such that air flows through the nozzle prior to flowing through the mesh and collector electrodes. The nozzle may be configured with a contraction factor which increases the airflow velocity by this contraction factor rate, also lowering the pressure in that region, aiming to entrain more particulate laden air into the device.

The presence of a filter mesh after the nozzle may generate turbulence immediately behind the mesh. The nozzle/nozzle portion and/or filter mesh may generate/create a region of low-pressure within the device around the collector electrodes. The low-pressure cavity may increase the quantity of tyre particulates entering the device.

The device may comprise a charging circuit connected to the or each collector electrode for electrostatically charging the one or more collector electrodes. The charging circuit may be connectable to a power source of the device and/or the vehicle. The charging circuit may be operable to output and/or apply a positive or negative charging voltage or a reference voltage (e.g. ground) to one or more of the collector electrodes. The charging voltage may be in the range of substantially (±) 5-15 kV, or 5-7, 7-9, 9-11, 11-13, 13-15 kV, or any combination or sub-combination of these ranges. The charging circuit may comprise a power source of the device. The power source of the device may be or comprise a dynamo generator configured to generate electrical power in response to motion of the vehicle relative to the drive surface. The dynamo generator may be configured to generate electrical power in response to rotary motion of the tyre or wheel. The dynamo generator may comprise a rotatable driving element configured to frictionally engage the tyre or wheel (e.g. at a rim of the wheel) so as to rotate therewith. The charging circuit may comprise one or more electrical components known in the art to convert the power output from the power source(s) into the charging voltage, including but not limited to a rectifier circuit and a DC voltage amplifier. Charging circuit may include a full or half bridge rectifier for converting an AC voltage (such as that from a dynamo) into a DC voltage. The charging circuit may comprise a voltage converter to step up the DC voltage to a range suitable for charging the collector electrodes.

The device may comprise a control module connectable to the charging circuit. The control module may be configured to selectively activate and/or deactivate charging of the one or more collecting electrodes, e.g. in response to one or more detected driving conditions. The one or more driving conditions may include, but are not limited to, one or more of acceleration, braking, cornering, and/or a driving surface condition such as wetness. Since particulates are primarily produced during acceleration, braking, cornering, the control module allows the filter unit to be activated only when it needs to be, reducing the power consumption of the device without compromising the collection of particulates.

The control module may be connectable to an electronic control unit (ECU) of the vehicle for receiving driving data indicative of the one or more detected driving conditions. Alternatively or additionally, the device may comprise one or more sensors connected to, or in communication with, the control module for detecting the one or more detected driving conditions and providing driving data to the control module. The control module may comprise one or more processors and/or a memory for processing the driving data and determining whether to activate or deactivate charging of the one or more collecting electrodes.

The one or more sensors may include, but are not limited to, an inertial measurement unit, an accelerometer, and/or one or more environmental sensors. The one or more environmental sensors may include a wetness, temperature and/or humidity sensor for detecting a driving surface condition. The one or more sensors may include a proximity sensor to detect proximity of the device to an object such as a curb. The control module may be configured to send a signal to the vehicle ECU to alert the driver of a detected proximity of the device to an object. This may help prevent damage to the device through impacts with an object, such as a curb.

The device may further comprise a means for moving the position of the device or collector electrodes relative to the vehicle. For example, the device or collector electrodes may be movable (e.g. rotatable, pivotable or otherwise movable in one or more directions) between a retracted or non-operative position and a deployed or operative position via a mechanical actuator. The control module may be configured to operate the actuator to move the device or collector electrodes between the operative and non-operative positions. The control module may be configured to operate the actuator to move the device from an operative position to the retracted position in response to the proximity sensor continuing to detect proximity of an object, such as a curb, after sending the signal to the vehicle ECU. The control unit may be configured to alter the geometry of the device by moving the collector electrodes.

The control module may be in communication with one or more external sensors or devices of the vehicle, e.g. though the ECU. The one or more external sensors or devices may include a GPS system. The control module may be configured to receive information or data, such as a driving data and/or weather data, from the one or more external sensors or devices of the vehicle.

The one or more sensors may include one or more collection sensors for monitoring the volume, mass or amount of collected particulates, or a fill level of the storage unit. The collection sensor(s) may comprise an infrared (e.g. depth) sensor for detecting a fill level of the storage unit, and/or a sensor for monitoring the weight of the storage unit.

The one or more sensors may comprise one or more particle sensors. The particle sensor may be or comprise a particle counter, particle analyser, and/or a spectrometer. The one or more particle sensors may be configured to measure the number or amount of particles collected and output measurement data to the control module. The one or more particle sensors may be optical sensors that use infrared or other electromagnetic wavelengths to measure the amount/number of particles collected.

The control module may be configured to determine and monitor a particulate collection efficiency based on one or more signals from the collection and/or particle sensors. The control module may monitor the change in weight of the collector electrodes per given distance. The control module may monitor the collection efficiency in milligrams per kilometre. The control unit may use information sent from a GPS system to calculate the distance travelled by the vehicle in order to calculate capture efficiency. The control unit may compare the measured collection efficiency with a pre-defined/target efficiency or efficiency range. The control module may be configured to control the charging circuit to adjust the charging voltage applied to the collector electrodes in response to determining the collection efficiency to be above and/or below a predetermined value.

The one or more sensors may be or comprise an imaging device or camera. The camera(s) may be arranged or configured to image the tyre and/or electrodes. The control module may be configured to monitor/determine tyre tread wear and/or saturation of the collector electrodes based on the output of the camera(s).

The filter unit may comprise a cleaning means for removing or cleaning collected particulates from the one or more collector electrodes. The cleaning means may operate continuously, periodically, or selectively when the collector electrodes are not charged. This may prevent the collection efficiency of the filter unit dropping substantially over time as particulates build up on the collection electrodes.

The device may comprise a receptacle for storing collected particulates that are removed or cleaned from the collector electrodes by the cleaning means. The receptacle may be mountable in a position to receive the collected particulates removed/directed by the cleaning means. The receptacle may be in fluid communication with the filter cavity. The receptacle may be removable from the device. This may prevent the collected particulates that are removed from the collector electrodes being released into the environment, and allow them to be disposed of in a controlled manner and/or recycled. The receptacle may be configured to hold a volume of 10-500 cm$^3$, or 10-50, 50-100, 100-150, 150-200, 200-250, 250-300, 350-400, 450-500 cm$^3$, or any combination or sub-combination of these ranges.

The cleaning means may be mechanical and/or non-mechanical. A mechanical cleaning means may be or comprise one or more mechanical vibrators configured to transfer a mechanical vibration (e.g. resonant or non-resonant) to the or each collector electrode to remove or clean collected particulates from the one or more collector electrodes. The mechanical vibrator(s) may be or comprise an ultrasonic vibrator. Alternatively or additionally, a mechanical cleaning means may be or comprise one or more moveable cleaning members (e.g. wiping blades, brushes, sponges etc.) configured to move over or across a surface of the or each collector electrode to remove or clean collected particulates from the surface. The moveable cleaning member(s) and/or mechanical vibrator(s) may be driven by one or more motors or actuators (linear or rotary). The charging circuit may comprise or be connected to the one or more motors or actuates to operate them. The control module may control the one or more motors. A non-mechanical cleaning means may utilise an airflow, preferably a clean airflow, to blow the collected particulates off the collector electrode(s). In one example of an airflow-based cleaning means, the filter unit may comprise an inlet conduit in fluid communication with the filter cavity for receiving a substantially clean airflow and directing the clean airflow over and/or past the one or more collector electrodes to remove or clean collected particulates therefrom. Optionally or preferably, an inlet valve may be provided in or in communication with the inlet conduit to control intake of the clean airflow.

The mechanical and non-mechanical cleaning means may be implemented separately or in combination. The inlet valve may be controlled by the control module.

Alternatively or additionally, the non-mechanical cleaning means may be or comprise or utilise an ionising jet. The ionising jet may comprise charged particles or ions. The charged particles or ions may interact with the captured charged tyre particulates to remove any residual charge from the tyre particulates. The ionising jet may comprise a high energy ion cloud, comprising a large number of positive and negative ions. The ion cloud neutralises any statically charged surface of either positive or negative polarity (such as the collector electrodes) in proximity to the ion cloud. The device may comprise a means for generating the ionising jet or ion cloud. The ionising jet may be formed using any known means, such as a corona discharge device, air ioniser, ion generator, or electrostatic discharge ioniser. The ionising jet may be configured to remove any residual charge from the captured particulates, making them neutral. Neutral particulates will not experience any attractive electrostatic force from the one or more collector electrode. The ionising jet may be used periodically in order to clean the one or more collector electrodes.

Alternatively or additionally, the non-mechanical cleaning means may be or comprise or utilise a water flow. Water may enter the device in certain wet weather scenarios. The device may comprise means for capturing and/or directing water which enters the device over the collector electrodes. This may flush away contaminants built up in the device during operation. The captured water may be used to clean the inlet, the one or more capture electrodes, and/or any other internal spaces in the device. When using captured water to flush away contaminants, the device or control module may be configured to close/seal the storage unit/receptacle for storing collected particulates, to prevent the captured particulates from being washed away, e.g. in response to an environmental sensor detecting water or moisture.

The one or more collector electrodes may comprise an array of two or more collector electrodes arranged substantially perpendicular to the flow or airflow such that the flow or airflow passes between at a pair of adjacent electrodes on its passage through the array. The charging circuit may be configured to apply a charging voltage to alternate collector electrodes in the array and apply a reference voltage to the rest of the collector plates in the array, or vice versa. The charging circuit may be configured to apply a positive charging voltage to alternate collector electrodes in the array and apply a negative charging voltage to the rest of the collector plates in the array, or vice versa. This provides an electric field in a direction substantially transverse to the incoming particulate flow to force charged particulates to the charged collector electrodes. Using an alternating array of positively and negatively charged collector plates may also provide a substantially uniform electric field, such that particulates experience a larger resultant electrostatic force towards one of the collector plates, which may increase collection efficiency.

The tyre composition dictates whether particulates are insulating or conductive. Under friction, insulators become positively charged, and conductors become negatively charged. As such, in addition, using an alternating array of positively and negatively charged collector plates may ensure that both positively and negatively charged particulates are captured by the device, and therefore that particulates released from tyres of all composition types are captured.

The charging voltage applied to the collector plates may be positive, negative or neutral so as to positively, negatively or neutrally charge the respective collector plates. The charging circuit may be configured to change or reverse the polarity of the charging voltage applied to each collector electrode, e.g. periodically. Reversal of the charging voltage polarity may actively eject captured particles to aid cleaning the electrodes. The charging circuit may be configured to apply a neutral charging voltage, or no charging voltage, to the array of collector electrodes, such that they have a neutral or zero net charge. The charging circuit may be configured to discharge the collector electrodes such that they have a neutral or zero net charge. When the electrodes are neutrally charged, particulates may pass through without experiencing any electrostatic forces.

The charging circuit may be configured to operate in one or more different charging modes for different charge configurations of the collector electrodes. The charging mode may be activated and/or controlled by the control module.

The charging modes may include a first mode in which the collector electrodes are alternately charged with a constant positive and negative charging voltage, or a positive/negative and a neutral voltage. The charging modes may comprise a second mode in which the collector electrodes are all neutrally charged and/or powered down. The charging modes may include a third mode in which the polarity of the charging voltage on each collector plate is periodically reversed.

The control module may be configured to change the charging mode in response to receiving signals from the one or more sensors. The control module may be configured to activate the second charging mode in response to detecting wet weather conditions when the cleaning means is activated/operated. The control module may be configured to activate the third charging mode in response to detecting a reduction of collection efficiency, e.g. which may indicate a build-up of attracted particles.

The or each collector electrode may be formed of, or comprise, or be coated with, a conductive material. The conductive material may be or comprise one or more of: copper, brass, steel, aluminium, a metal alloy, a conductive polymer, conductive micro or nanoparticles, and/or a carbon-based material such as graphite, graphene and/or carbon nanotubes/particles. One or more of the collector electrodes may be substantially flexible. A flexible collector may aid cleaning/removal of collected particulates by the cleaning means. The collector electrodes may be removable or replaceable. The collector electrodes may further comprise a non-stick exterior coating, such as polytetrafluoroethylene (PTFE or Teflon™) or other suitable polymer materials (which may be conductive or non-conductive). This may help removal of collected particulates from the collector electrodes by the cleaning means.

The or each collector electrode may have an exterior surface coating. The surface coating may be configured to increase the surface area of the collector electrode. This may increase tyre particulate capture efficiency. The surface coating may be configured to improve the durability of the or each electrode. The surface coating may be configured to protect the or each electrode from the environment, e.g. chemical damage, such as rust. The surface coating may be configured protect the or each electrode from impact damage.

The surface coating may be or comprise an electrically insulating coating. The insulating coating may enable certain conductive tyre particulates to retain their charge when in contact with the collector electrodes. Maintaining the charge of the tyre particulates may ensure that the particulates continue to experience an attractive electrostatic force when in contact with the collector electrodes and remain stuck to the electrodes.

The surface coating may be or comprise a hydrophobic surface coating. Using a hydrophobic surface coating may repel water and prevent water from building up on the or each electrode. Preventing water build up may in turn increase capture efficiency. A hydrophobic coating may also prevent water build-up which may wash away tyre particulates from the collector electrodes.

The collector electrodes in the array may be separated by a distance of approximately 1-5 cm, or 1-2, 2-3, 3-4, 4-5 cm, or any combination or sub-combination of these ranges.

The or each collector electrode may be or comprise a substantially planar or plate-like element. Where the collector electrodes are planar, these may be arranged substantially parallel to the flow and to each other when the filter unit is in the operative position. Optionally, the planar electrodes may be arranged substantially parallel to vertical. This may provide a low resistance to flow or airflow into the filter cavity.

The or each collector electrode may have a length in the direction of the flow or airflow into/through the filter unit. The length may correspond to that of an arc made from an angle of approximately 5-40 degrees, or 5-10, 10-15, 15-20, 20-25, 25-30, 30-35, 35-40 degrees, or any combination or sub-combination of these ranges. In this way, the collector electrode(s) extend over at least a portion of the radially outer surface of the tyre or wheel. The or each collector electrode may have a depth in a direction substantially perpendicular to the direction of the flow or airflow into/through the filter unit. The depth may be in the range of substantially 10-200 mm, or 10-50, 50-100, 100-150, 150-200 cm, or any combination or sub-combination of these ranges. This may provide an extended electric field region around the tyre or wheel for improved collection efficiency of particulates.

Alternatively, the or each collector electrode may be or comprise a substantially curved or non-planar element. The or each collector electrode may be substantially cylindrical or rod-like in shape, or spiral-shaped. The cylindrical or rod-like electrodes may be arranged in linear, square, rectangular, triangular, or hexagonal array. Alternatively, the array of collector electrodes may comprise a combination of planar and non-planar or curved elements. One of the collector electrodes may be or comprise a fixed electrode and another of the collector electrodes may be or comprise a rotatable electrode to collect charged particulates on its surface as it rotates. The fixed collector electrode may be or comprise a substantially planar element. The rotatable collector electrode may be or comprise a cylindrical-shaped element that rotates about its central axis.

The or each collector electrode may be or comprise a plate, lattice, matrix, grid, rolling drums, a wire grid plate, or woven wire grid plates.

One or more of the collector electrodes may be configured, e.g. with a specific geometry, to attract/trap charged particulates and/or cause charged particulates to accumulate at specific regions of the respective electrode. One or more of the collector electrodes may be configured (e.g. with one or more sharp corners and/or bends) to generate a non-uniform electric field, e.g. with greater or enhanced charge and electric field generated at specific regions of the respective electrode. This may increase the electrostatic force exerted upon the charged particulates at those specific regions.

The device may be configured to separate charged particulates from the incoming airflow. The device may be configured to separate different size charged particulates by charging different collector electrodes to different charging voltages. For example, collector electrodes with higher charging voltages can be used to capture larger particulates and collector electrodes with lower charging voltages can be used to capture smaller particulates. The filter unit may comprise a plurality of collection regions along the flow path, wherein each collection region comprises collector electrodes with a different charging voltage. In this way, different sized particulates can be captured at different regions within the filter unit.

One or more collector electrodes may be arranged and/or configured with a specific geometry to create an electric field to influence the trajectory of the charged particulates in a predetermined way. One or more collector electrodes may have a specific geometry to create an electric field that separates charged particulates from the incoming airflow. The device may be configured to direct charged tyre particulates into specific regions within the device i.e. a storage unit.

The device may comprise a primary flow path defined between an inlet for receiving a flow of air containing a concentration of particulates from a contact point (or contact area) between the tyre or wheel and the driving surface and an outlet for outputting a flow of air with a substantially reduced concentration of particulates. One or more of the collector plates may be arranged and/or configured to apply an electrostatic force (e.g. substantially transverse to the flow path) to direct charged particulates out of the primary flow path for collection, e.g. to the electrostatic filter unit and/or a storage unit.

The average collection efficiency of a rear mounted device may be in the range 55-80%, or 55-60, 60-65, 65-70, 70-75, 75-80% or any combination or sub-combination of these ranges.

The charging circuit may be configured to store energy or charge discharged from the collector electrodes, e.g. for later use. Charge or energy discharged from the collector plates may be stored in a capacitor or supercapacitor. The collector plates may discharge when reversing the polarity of the charging voltage (e.g. the third charging mode) or discharging or applying a neutral charging voltage to the collector plates (e.g. the second charging mode). Charge or energy may additionally be discharged when the collector plates are cleaned and particulates are removed from the electrodes. The charging circuit may be configured to use the stored charge to at least partially charge the collector plates.

The filter unit may comprise a charging stage for charging particulates. The charging stage may be located upstream of the collecting stage or collector electrode(s). The charging stage may comprise an electrostatically chargeable conductive grid. The grid may comprise a conductive mesh or a plurality of conductive wires. The charging stage may be or comprise a corona discharge device. The charging stage may be or comprise an ion generator. The electrostatically chargeable conductive grid may be positioned and/or extend across the inlet opening of the filter cavity. The electrostatically chargeable conductive grid is connected to the charging circuit for receiving a charging voltage. The charging voltage may be a negative voltage that is greater than the charging voltage applied to the collector electrodes to ionise the air surrounding the conductive grid and transfer a negative charge to the particulates as they pass through the conductive grid. Alternatively, the charging voltage may be a positive voltage to ionise the air surrounding the conductive grid and transfer a positive charge to the particulates as they pass through the conductive grid. The charging voltage for the conductive grid may be in the range of substantially ($\pm$) 10-20 kV, or 10-12, 12-14, 14-16, 16-18, 18-20 kV, or any combination or sub-combination of these ranges. The charging voltage for the conductive grid may be at least twice the charging voltage applied to the collector electrode(s). The charging stage may allow the device to collect or capture particulates that are insufficiently charged or not charged through wear on the driving surface. The charging stage may be configured to transfer charge to the particulates to amplify/increase the charge already on the particles to a uniform level to increase capture efficiency, and/or charge any uncharged tyre particulates.

The electrostatically chargeable conductive grid may be or comprise the filter mesh. Using the filter mesh as the conductive grid of the charging stage may reduce the size of the device, since a separate charging stage may not be required.

The device or filter unit may comprise an outlet. The outlet may allow air entering the device through the inlet opening to exit the device. The outlet may allow air passing through the device to return to the freestream, i.e. the airflow around the device. The outlet may allow laminar/smooth air passing through the device to return to the turbulent wake behind the wheel. This may reduce turbulence and therefore reduce the drag force exerted on the vehicle.

The device may have a specific geometry configured to separate out remaining particulates from the airflow downstream of the collector electrodes and thereby return clean air to the atmosphere. The remaining particulates may be tyre particulates which were not captured by the collector electrodes. The device may comprise one or more filters to separate out remaining particulates from the airflow, such as HEPA filters. Alternatively or additionally, the remaining particulates may be separated from the airflow using cyclonic or centrifugal separation. The device may comprise a cyclonic or centrifugal separation device, as is known in the art. The cyclonic or centrifugal separation device may be configured (e.g. with a cylindrical or conical conduit) to receive an outlet airflow and generate a rotating helical airflow that directs remaining particulars out of the outlet airflow, e.g. to a storage unit for collection.

Cyclonic or centrifugal separation may be used to separate and categorise particles according to size. The separation device may be configured to output data representing a size distribution of particles to the control module.

The device may be configured with a form factor (size and shape) that positively influences vehicle aerodynamics. For example, the positioning of the device behind the wheel may positively influence vehicle aerodynamics. The position and/or form factor of the device may be configured to reduce turbulence and increase the downforce exerted on the vehicle, which may aid vehicle performance and handling. Vehicle drag may also be reduced, increasing fuel efficiency. For example, positioning the device behind the wheels may reduce turbulence behind each wheel. The device may increase downforce by decreasing the distance between the underside of the vehicle and the ground. The form factor of the device may be configured to cause the device to act as an aerofoil that generates negative lift, thus increasing downforce. The form factor of the device may be configured to produce an increased downforce in response to high velocity airflow.

The device may have different form factors depending on whether the device is to be fitted on the front or rear wheels. The different form factors may make the device more effective in response to different oncoming airflow characteristics.

The device may be most effective when positioned in regions of low pressure and high velocity since it would receive a greater number of tyre particulates and would also provide greater downforce. The airflow towards the inner face of the wheel (nearest the centre line of the vehicle) encounters airflow at higher velocity and lower pressure. The device may be designed in such a way to capture a higher number of particulates in this region.

According to a second aspect of the invention, there is provided a method of collecting or capturing particulates that are released from a tyre or a wheel of a vehicle through wear on or against a driving surface when the vehicle is moving using the particulate collecting device of the first aspect. The method may comprise receiving, at the electrostatic filter unit mounted in the operative position, a flow of particulates from a contact point between the tyre or wheel and the driving surface; and collecting or capturing the particulates in the flow by electrostatic attraction.

The filter unit may comprise one or more electrostatically chargeable collector electrodes, and the step of collecting or capturing the particulates in the flow by electrostatic attraction may comprise charging at least one of the one or more collectors electrodes to attract the particulates in the flow to the at least one collector electrode. Optionally or preferably, where the particulates are charged, the method may comprise collecting or capturing the particulates in the flow by electrostatic attraction without pre-charging the particulates.

The step of receiving a flow of particulates from the contact point may comprise receiving, at the electrostatic filter unit mounted in the operative position, an airflow around the tyre or wheel containing said particulates entrained therein.

The method may further comprise: cleaning or removing collected or captured particulates from the one or more collectors electrodes using a cleaning means of the device; and storing, in a receptacle of the device, collected particulates removed from the one or more collector electrodes by the cleaning means. Optionally or preferably, the receptacle is removable, and the method further comprises removing the receptacle from the device for processing the stored collected particulates.

The cleaning means may be mechanical or non-mechanical (see first aspect). The cleaning means may be or comprise a mechanical vibration mechanism, one or more moveable cleaning members (e.g. wiping blades, brushes, sponges etc.), an airflow, a water flow, an ionising jet. Additionally or alternatively, the polarity of the charging voltage applied to the collector electrodes may be reversed to repel the captured particulates when cleaning.

The method may further comprise charging the at least one of the one or more collectors electrodes in response to one or more detected or determined driving conditions. Optionally or preferably, wherein the one or more driving conditions include one or more of acceleration, braking, cornering, and/or a driving surface condition. The method may further comprise receiving driving data indicative of the one or more driving conditions. The method may further comprise processing the received driving data to determine one or more driving conditions.

According to a third aspect of the invention, there is provided a vehicle comprising a particulate collecting device according to the first aspect. The device may be attached to the vehicle in close proximity to a tyre or wheel of the vehicle for capturing particulates that are released from the tyre or wheel through wear on or against a driving surface when the vehicle is driven on the driving surface. The vehicle may comprise wheels with or without a tyre fitted to the wheel. Optionally or preferably, where the vehicle is a tyre-fitted vehicle the particulates are tyre particulates released from the tyre of the wheel through wear on or against the driving surface.

According to a fourth aspect of the invention, there is provided a particulate collecting device for collecting or capturing particulates that are released from a tyre or a wheel through wear or processing on or against a surface. The particulates may be produced by an apparatus. The apparatus may comprise the tyre or wheel. The apparatus may be for processing and/or shredding used tyres for recycling or disposal. The device may be attachable in a position in the vicinity of the tyre or wheel. The device may comprise an electrostatic filter unit for collecting or capturing the particulates by electrostatic attraction. The electrostatic filter unit may be mountable in an operative position relative to the wheel of the vehicle for receiving a flow of particulates from a contact point between the tyre or wheel and the surface. The operative position may be in close proximity to the tyre or the wheel. The filter unit may be configured to collect or capture the particulates in the flow by electrostatic attraction. The filter unit may be configured to collect or capture charged particulates in the flow. The electrostatic filter unit may comprise one or more electrostatically chargeable collector electrodes for attracting the particulates (in the flow) to the or each collector electrode when charged to collect or capture the particulates.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s), and vice versa, and these embodiments are specifically envisaged.

BRIEF DESCRIPTION OF DRAWINGS

In order that the invention can be well understood, embodiments will now be discussed by way of example only with reference to the accompanying drawings, in which:

FIGS. 6(*a*) and 6(*b*) show, respectively, a schematic plan view and perspective view of an example collector electrode arrangement for a particulate collecting device;

FIG. 7 shows the collector arrangement of the device of FIGS. 2 and 3;

Figure 1:
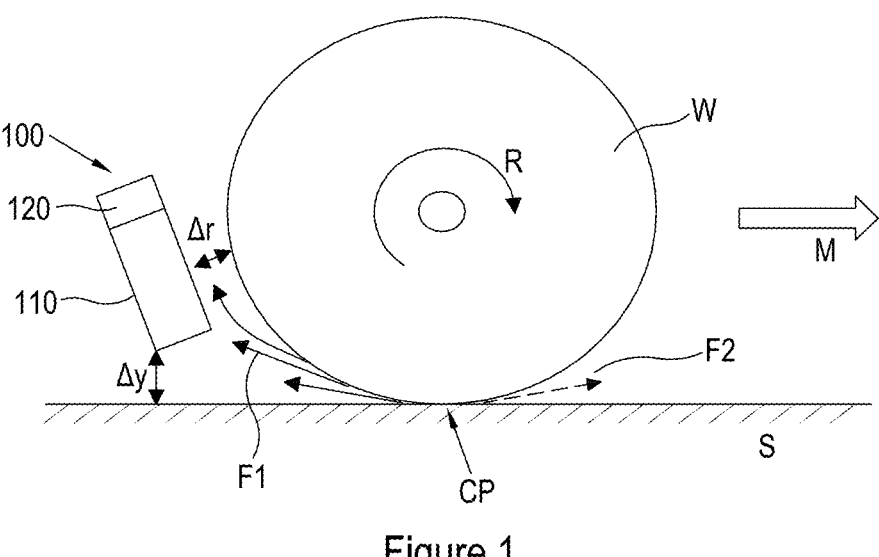
FIG. 1 shows a schematic diagram of a particulate collecting device according to an embodiment of the invention.

It should be noted that the figures are diagrammatic and may not be drawn to scale. Relative dimensions and proportions of parts of these figures may have been shown exaggerated or reduced in size, for the sake of clarity and convenience in the drawings. The same reference signs are generally used to refer to corresponding or similar features in modified and/or different embodiments.

DETAILED DESCRIPTION

FIG. 1 shows a schematic diagram of a particulate collecting device 100 according to an embodiment of the invention. The device 100 is attachable to a vehicle (not shown) in the vicinity of a wheel W of the vehicle to collect or capture particulates that are released from the wheel W or a tyre fitted to the wheel W (not shown) through wear on or against a driving surface S, such as a ground or road surface, when the vehicle is in motion. The direction of motion and rotation of the wheel W is indicated by the arrows M and R, respectively. The device 100 comprises an electrostatic filter unit 110 for collecting or capturing the particulates and an attachment portion 120 for attaching the filter unit 110 to the vehicle, described in more detail below.

Tyre or wheel wear occurs at the contact point CP (or contact area) between the tyre T or wheel W and the driving surface S. Particulates from the tyre or wheel W are predominantly projected in a rearward direction when the vehicle is moving forward in direction M and particularly when the vehicle is accelerating, but some particulates can (at least initially) be projected in a forward direction when the vehicle is braking due to inertia. Example rearward and forward particulate flows from the contact point CP are indicated, respectively, by arrows F1 and F2. The device 100 can be attached in a position behind and/or in front of the wheel W (not shown) (relative to the direction of forward movement of the vehicle) to collect these particles. In both cases, the filter unit 110 is mounted in an operative position in close proximity to the tyre T or the wheel W for receiving a flow F1, F2 of particulates from the contact point CP. In this way, the device 100 is configured to collect or capture particulate emissions at their source to prevent them entering the environment. Once collected, these particulates can be disposed of in a controlled manner or recycled.

The device 100 can be used generally with any wheeled vehicle, including tyre-fitted vehicles such as cars, trucks, buses, heavy goods vehicles (HGV), motorcycles, scooters, bicycles or aircrafts, and non-tyre-fitted vehicles such as rail vehicles that run on tracks, e.g. trains, trams. Where the vehicle is a tyre-fitted vehicle the particulates are tyre particulates released from the tyre of the wheel through wear on or against the driving surface S. Where the vehicle is a non-tyre-fitted vehicle the particulates are typically metal particulates produced form the wear of metal rail wheels on metal tracks. The device 100 may be attached to the vehicle during assembly or retrofitted to an existing vehicle. Embodiments of the device 100 are described below primarily in the context of tyre-fitted vehicles, but the features and principles described apply equally to collecting particulates from wheels of non-tyre-fitted vehicles.

The filter unit 110 is configured to collect or capture the particulates in the flow F1, F2 by electrostatic attraction. The electrostatic filter unit 110 comprises one or more electrostatically chargeable collector electrodes 114 for attracting the particulates in the flow F1, F2 to the or each collector electrode 114 when charged, described further below with reference to FIGS. 6(*a*) and 6(*b*). To electrostatically charge a collector electrode 114, a charging voltage of several kV (substantially (±) 5-15 kV) is applied via a charging circuit 140 (described below) to create an electrical potential of positive or negative charge. Positively charged would be attracted to a negatively charged collector electrode 114 and negatively charged particulates would be attracted to a positively charged collector electrode 114.

Figure 13A:
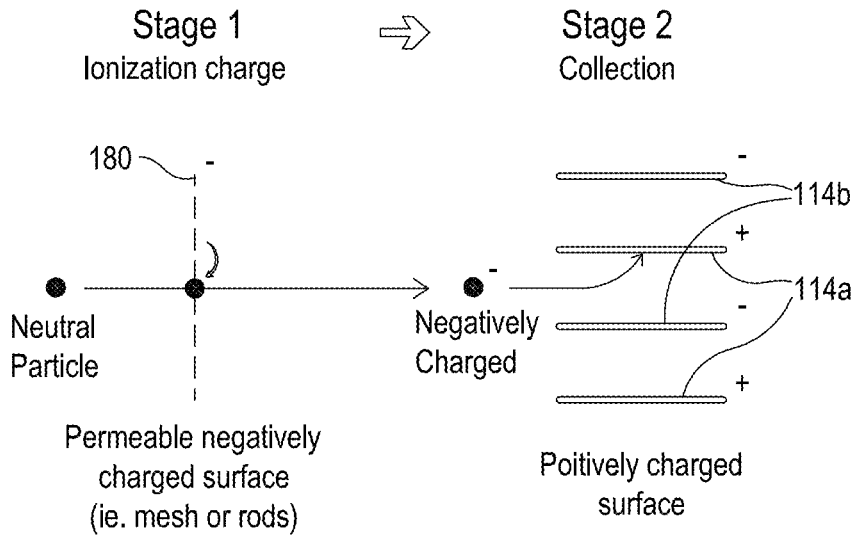
FIGS. 13(*a*) and 13(*b*) show the operation of a charging stage for a particulate collecting device.
Figure 13B:
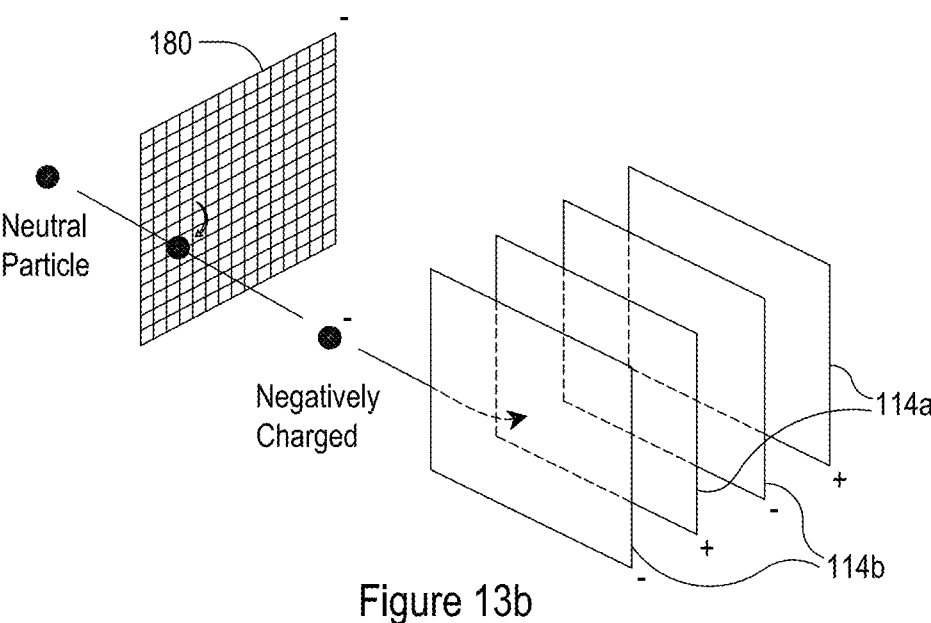

The filter unit 110 essentially operates as an electrostatic precipitator. Known electrostatic precipitators used in air-cleaning applications comprise a charging stage to charge the particulates to be collected and a collection stage to capture them. Through experiments, the inventors have found that particulates generated through tyre or wheel W wear are generally charged through the interaction (friction) between the tyre or wheel W and the driving surface S. Specifically, carbon in tyre particulates is positively charged. Therefore, unlike known two-stage electrostatic precipitators, it is not necessary for the device 100 of the present invention to comprise a charging stage to pre-charge the particulates before collecting them at the collector electrodes 114. However, the device 100 may include a charging stage to pre-charge particulates, for example, if a fraction of the particulates is not charged or insufficiently charged through the wear process, as described in more detail below with reference to FIGS. 13(a) and 13(b).

An important metric of the electrostatic filter unit 110 is the collection efficiency, which is defined as the ratio of the amount (in weight/mass) of particulates collected by the filter unit 110 to the amount (in weight/mass) of particulates that enter the filter unit but are not collected. The factors that influence the collection efficiency are primarily the position of the filter unit 110 that influences how much particulate material enters the filter unit 110 and the geometry of collector electrodes 114 that influences the amount of particulates collected.

As such, the location or operative position of the filter unit 110 is an important consideration for maximising the collection of particulates. The operative position of the filter unit 110 is in close proximity to the source of the particulates, i.e. the contact point CP, to collect or capture the most amount of particulates originating therefrom. In this context, "close proximity" means as close as practically possible without contacting the driving surface S or tyre or wheel W so as not to effect normal use or motion of the vehicle. Accordingly, the operative position of the filter unit 110 includes a minimum distance from the driving surface S, Δy (a driving surface or ground clearance), and a minimum distance from a radial outer surface of the tyre or wheel W, Δr (a tyre or wheel clearance), to avoid contact between the filter unit 110 and the driving surface S and tyre or wheel W in use (see FIG. 1).

In an embodiment, Δy and Δr are in the range of substantially 10-200 mm. However, it will be appreciated that the invention is not limited to these ranges. In practice, the ground and tyre/wheel clearance will be dependent on various factors including, but not limited to, the type of vehicle, normal use of the vehicle, tyre T/wheel W dimensions, and the characteristics of the driving surface S such as any commonly encountered objects or obstacles e.g. kerbs, speed bumps, undulations or pot holes.

Figure 2:
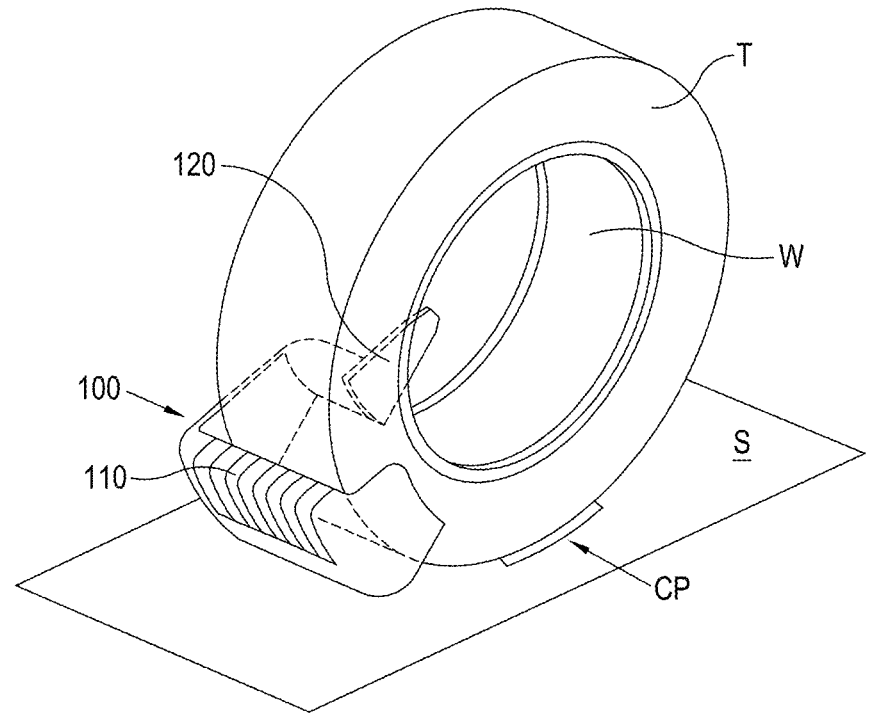
FIG. 2 shows an illustration of a particulate collecting device according to an embodiment of the invention.

FIG. 2 shows an embodiment of a device 100 for a tyre-fitted vehicle. The tyre T is fitted around the wheel W in the usual manner. The tyre T is composed of a rubber-based compound and may be solid or inflatable. In this case the particulates to be collected are tyre particulates. The device 100 can be in front or behind the wheel W, relative to the direction of forward motion of the vehicle.

Figure 3:
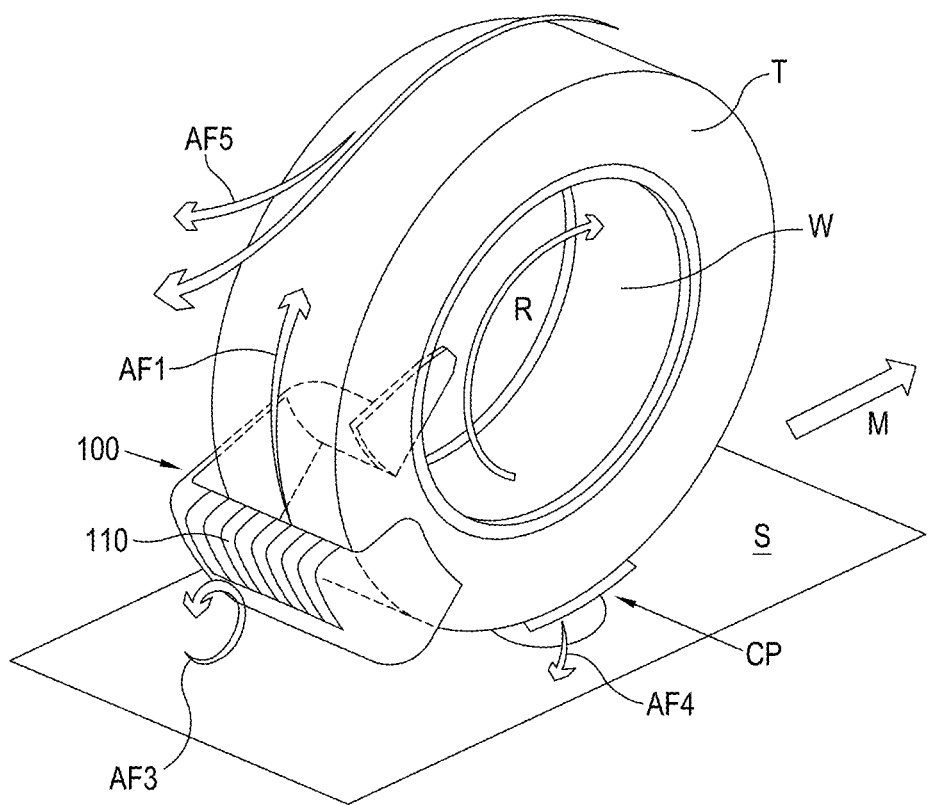
FIG. 3 shows the device of FIG. 2 positioned to receive an airflow around the wheel.

The particulates produced through tyre/wheel wear have a distribution of sizes. Larger particles may remain on the driving surface S or be projected away from the contact point CP, while smaller particulates e.g. less than 200 μm (which are of most relevance to pollution) can become entrained (at least for a period of time) in airflows around the tyre T, particularly those projected in a rearward direction (e.g. during acceleration and cornering). FIG. 3 illustrates various typical airflows around the tyre T or wheel W when the vehicle is moving across the surface S in the direction M. There is a streamline airflow AF5 over the tyre T or wheel W, a jet flow AF4 in the vicinity of the contact point CP, a region of turbulent airflow AF3 behind the tyre T or wheel W (relative to the direction of motion M), and a substantially upwardly directed cavity airflow AF1 around the back of the tyre T or wheel W in the direction of rotation R produced from the Magnus effect of the rotating tyre T or wheel W.

In an embodiment, the filter unit 110 is mounted in an operative position behind the wheel W of the vehicle for receiving the upwardly directed airflow AF1 around the tyre T containing the particulates entrained therein, as shown in FIG. 3. The airflow AF1 from the Magnus effect draws and/or directs the majority of particulates from the contact point CP around (at least a portion of) the tyre T or wheel W towards the filter unit 110. Exploiting the airflow AF1 around the wheel W increases the quantity of particulates received and therefore collected at the filter unit 110 while keeping the filter unit 110 relatively compact in size. However, the use of airflows is not essential, e.g. airflows may not play an important role in embodiments where the filter unit 110 is mounted in front of the wheel W to collect forward projected particulates (not shown).

Figure 4:
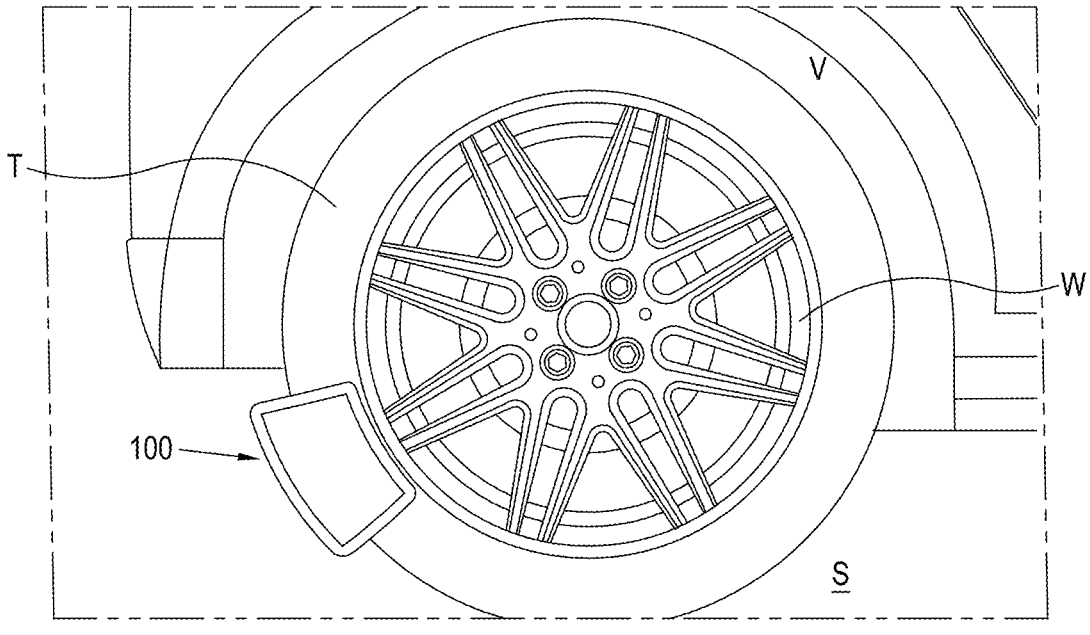
FIG. 4 shows an example of a particulate collecting device attached at a rear wheel of a vehicle.
Figure 5:
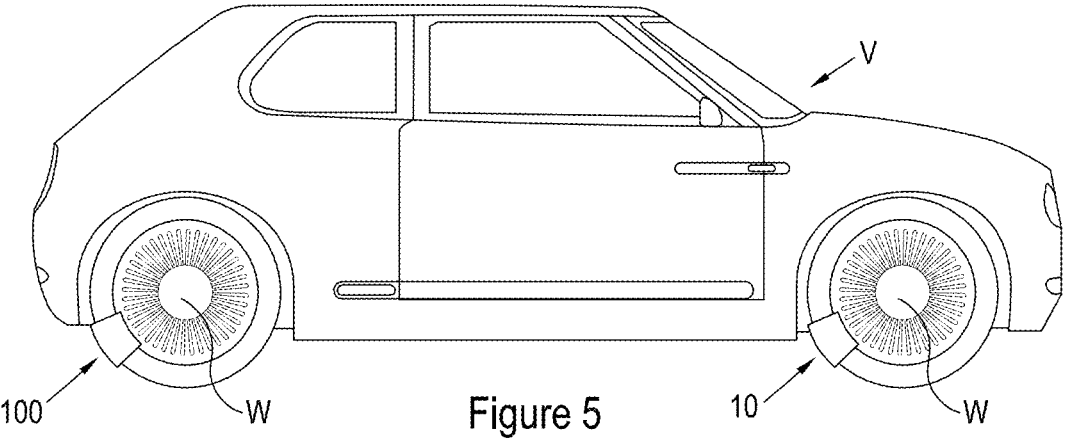
FIG. 5 shows a vehicle with particulate collecting devices at the front and rear wheels.

FIG. 4 shows an example of a rearward-mounted device 100 attached to a tyre-fitted vehicle V, in this case a car, in the vicinity of a rear wheel W. FIG. 5 shows an example of a tyre-fitted vehicle V with devices 100 attached in the vicinity of both the front and rear wheels W. It will be appreciated that the device 100 may be fitted to any number of the vehicle wheels W.

FIGS. 6(a) and 6(b) show an example collector electrode arrangement comprising an array of collector electrodes 114 arranged substantially perpendicular (or transverse) to the flow F1, F2 or airflow AF1 such that the particulates pass between two adjacent collector electrodes 114 on its passage through the array. The collector electrodes 114 are substantially planar or plate-like elements and arranged substantially parallel to the airflow AF1, to each other and to vertical, as shown. The planar collector electrodes 114 are spaced by a distance of 1-3 cm. This planar arrangement may present the least resistance to airflow AF1 through the collector electrodes 114. However, a planar arrangement is not essential, and alternative non-planar elements can be used instead, described further below with reference to FIGS. 14, 15(a), 15(b), 16(a) and 16(b).

Each collector electrode 114 extends for a length L in the direction of the flow F1, F2 or airflow AF1 through the filter unit 110, such that they extend over at least a portion of the radially outer surface of the tyre T or wheel W. Each collector electrode 114 also has a depth D in a direction substantially perpendicular to the direction of the flow F1, F2 or airflow AF1. In principle, the longer the length L of the collector electrodes 114 the longer the particulates spend in the electric field between adjacent collector electrodes 114 and the greater the probability of being collected or captured by the collector electrodes 114. Further, the deeper the collection electrode 114 the larger the electric field region, increasing the number of particulates that can be captured. (Both of which increase the collection efficiency.) In practice, the length L and depth D is a compromise between collection efficiency and space/compactness of the filter unit 110, and will be dependent on the type of vehicle and wheel dimensions.

The collector electrodes 114 in the array are alternatively charged with a positive and negative potential to form an alternating series of positively charged 114a and negatively charged 114b collector electrodes, as shown. This creates a strong electric field in the region between adjacent collector electrodes that exerts an electrostatic force (a Lorentz force) on charged particulates in the flow F1, F2 or airflow AF1 passing between the collector electrodes 114a, 114b that directs them towards the positively or negatively charged collector electrodes 114g, where they are captured and build up over time. In the example shown, the particulates are positively charged and are attracted to the negatively charged collector electrodes 114b. In another embodiment, depending on the charge of the particulates, one of the positively 114a or negatively 114b charged collector electrodes can be instead be grounded. This may reduce the complexity of the charging circuit 140.

FIG. 7 shows a planar collector electrode arrangement for the device 100 of FIGS. 2 and 3. The length L corresponds to that of an arc made from an angle of approximately 10-20 degrees. The depth D is in the range of substantially 10-200 mm. The edge or side of the collector electrode 114 facing the radially outer surface of the tyre T or wheel W may be curved as shown to maintain a close proximity to the radially outer surface over its length.

The collector electrodes 114 are formed of, comprise and/or are coated with, a conductive material. Examples of suitable conductive materials include copper, brass, steel, aluminium, a metal alloy, a conductive polymer, conductive micro or nanoparticles, and/or a carbon-based materials such as graphite, graphene and/or carbon nanotubes. The collector electrodes 114 may further comprise a non-stick coating such as polytetrafluoroethylene (PTFE) for ease of removing collected particulates from the collector electrodes 114, described below. In an embodiment, the collector electrodes 114 comprise an array of parallel copper plates spaced or separated by a distance of approximately 1-5 cm.

The collector electrodes 114 may comprise an electrically insulating coating to prevent direct electrical contact with the conductive material used to form the collector electrodes. The insulating coating prevents discharge and maintains the attractive electrostatic force between the particulates and the collector electrodes 114.

Additionally, or alternatively, the coating may be hydrophobic to promote water run-off from the surface of the collector electrodes 114. A build-up of water on the collector electrodes 114 can reduce the electric field strength between the collector electrodes 114 since water can act as a dielectric. If the electric field strength around the collector electrodes is reduced, the charged particulates experience a weaker electrostatic force and so the capture efficiency will be reduced.

The durability of the collector electrodes 114 may also be improved by using a surface coating. For example, the coating may prevent rust forming on the collector electrodes 114 and prevent debris such as gravel from chipping away the surface of the collector electrodes 114.

Figure 8:
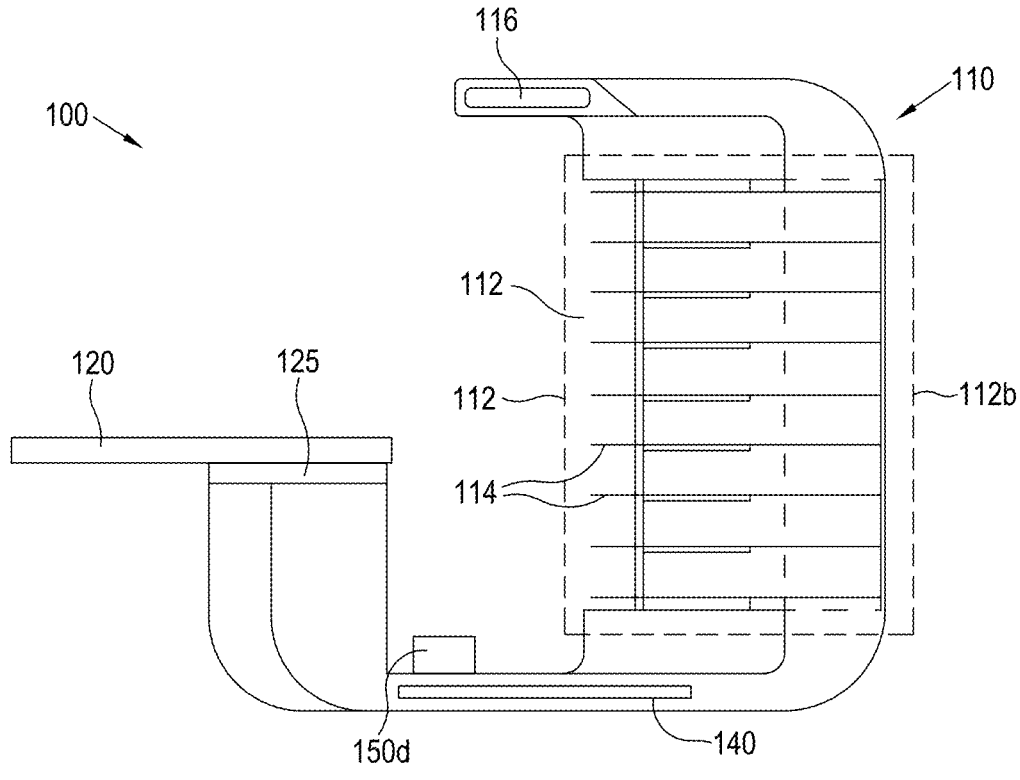
FIG. 8 shows the device of FIGS. 2, 3 and 7 in more detail.
Figure 9:
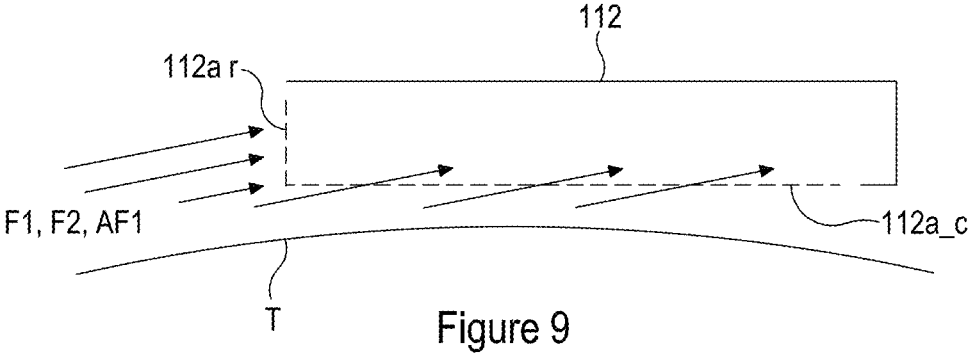
FIG. 9 shows a schematic diagram of the filter cavity of the device of FIG. 8.

FIG. 8 shows the device 100 of FIG. 7 in greater detail. The filter unit 110 comprises a filter cavity 112 which houses the collector electrodes 114 and has an inlet opening 112a through which the flow F1, F2 or airflow AF1 can enter the filter cavity 112 and interact with the collection electrodes 114. The inlet opening 112a is configured to face, at least in part, the tyre T or wheel W when the filter unit 110 is mounted in the operative position for receiving the flow F1, F2 or airflow AF1. The inlet opening 112a extends at least partially across the width of the tyre T, and preferably across the majority of the width of the tyre T. The inlet opening 112a may comprise a circumferential portion 112a_c that extends in a substantially circumferential direction, and a radial portion 112a_r that extends in a substantially radial direction (relative to the wheel W) to increase the flow F1, F2, or airflow AF1 entering the filter unit 110, as illustrated in FIG. 9. In other embodiments, the inlet opening 112a comprises a nozzle or nozzle portion 194, and the device 100 comprises an outlet 199 for returning substantially "cleaned" air to the freestream, as described below with reference to FIGS. 20 and 24.

Figure 10:
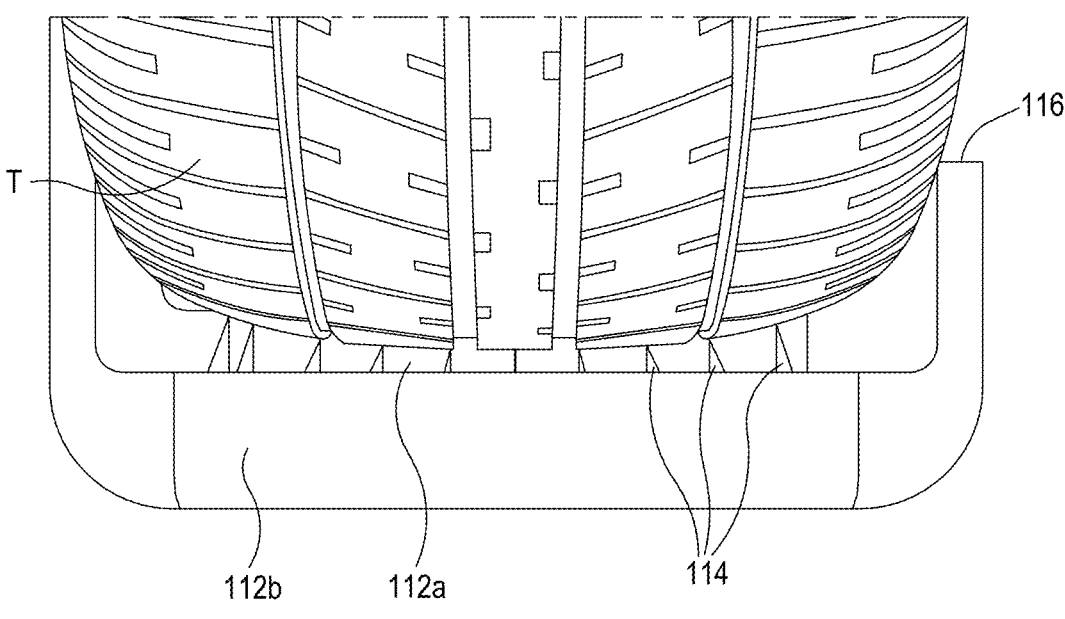
FIG. 10 shows the device of FIG. 8 mounted in an operative position with respect to the wheel of a vehicle.

FIG. 10 shows an example of the device 100 mounted in the operative position. The inlet opening 112a extends across at least 80% of the width of the tyre T and the tyre clearance is approximately 10-50 mm. The inlet opening 112a comprises a circumferential portion 12a_c and a radial portion 112a_r. In the illustrated embodiment, the filter unit 110 also comprises an at least partially transparent window portion 112b so that the collector electrodes 114 are visible from the exterior (although this is not essential). In an alternative example (not shown), the circumferential portion 112a_c and the radial portion 112a_r may be two separate (but adjacent) openings to the filter cavity 112, e.g. the separated by a wall of the filter cavity 112. The planar or plate-like collector electrodes 114 are arranged substantially parallel to each other and to vertical, with a spacing of approximately 2 cm.

In an example where the filter unit 110 comprised three parallel copper plate electrodes 114, alternately charged and grounded with a charging voltage of approximately 7 kV, and positioned behind the wheel W in close proximity to the tyre T, the average collection efficiency of the rear mounted device 100 was in the range 55-70%.

Referring again to FIG. 8, the attachment portion 120 is configured to attach the device 110 to the vehicle at a mounting point on the wheel assembly of the vehicle (not shown) such that the operative position of the filter unit 110 is substantially fixed axially and radially relative to the wheel W. In this way, the filter unit 110 is able to move with the wheel W of the vehicle whilst maintaining the operative position (in this context, movement of the wheel includes up, down, and corning movements). For example, where the wheel assembly is or comprises a suspension and/or steering assembly, the filter unit 110 is able to move with the vehicle suspension and/or when the wheel W is turning. In an embodiment, the device 100 is attachable to the knuckle or steering knuckle of a vehicle suspension system.

In an alternative embodiment (not shown), the attachment portion 120 is configured to attach to the vehicle body, underside, wheel arch, or an accessory such as a mud flap. In this case, the operative position of the filter unit 110 is substantially not fixed relative to the wheel W. This may be appropriate, for example, where the vehicle does not comprise suspension, and/or for wheels that do not turn for corning (e.g. a rear wheel). However, this embodiment is not limited to these cases.

The attachment portion 120 may comprise a flexible joint 125 to accommodate temporary displacement of the filter unit 110 from the operative position, e.g. in the event of an impact with an object or the driving surface S. The joint 125 may be configured to bias the filter unit 110 towards the operative position, so as to maintain the filter unit 110 in the operative position and return it to the operative position after a displacement from the operative position. For example, the joint 125 may be spring loaded, or comprise any other biasing means known the art.

Figure 12:
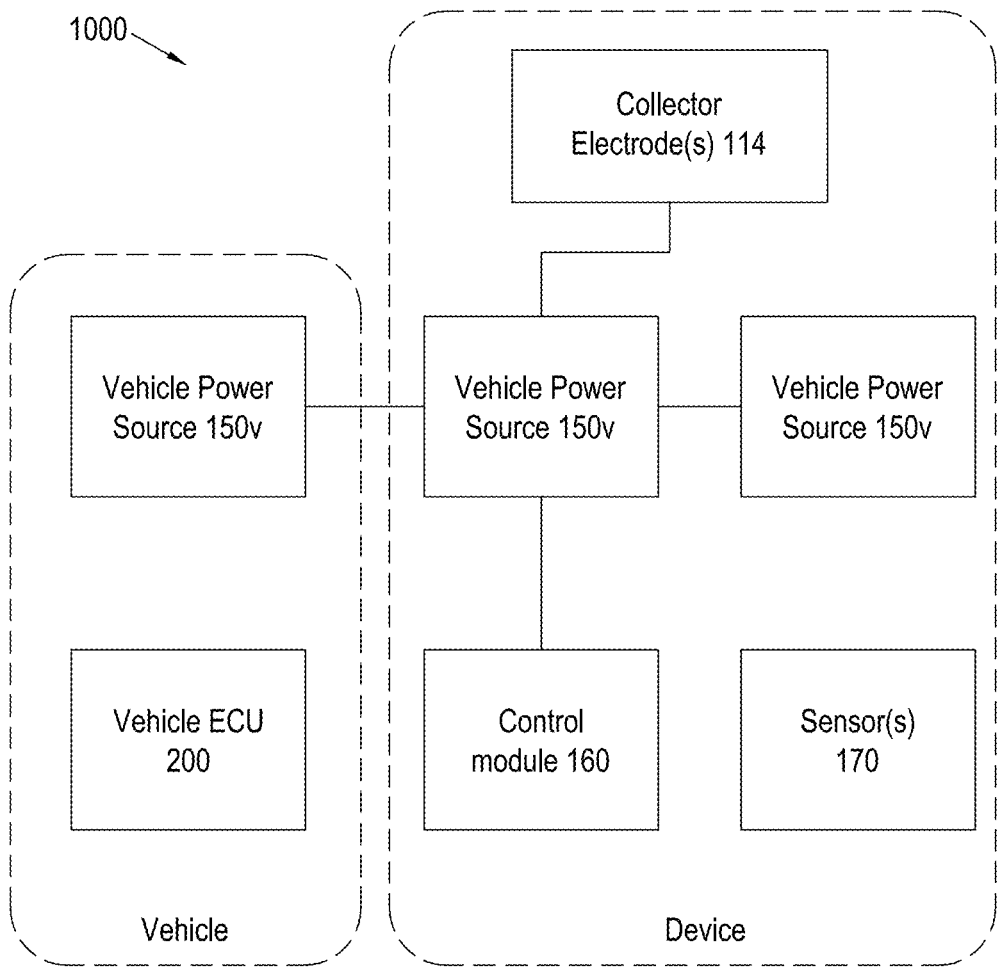
FIG. 12 shows a block diagram of a control system for operating a particulate collecting device.

FIG. 12 shows a block diagram of an example control system 1000 for operating the device 100. Parts of the system 1000 may be located in or on the device 100 and other parts may be located in or on the vehicle V. The device 100 comprises a charging circuit 140 for charging the collector electrodes 114. The charging circuit 140 is connected to the collector electrodes 114 and operable to output or apply a positive or negative charging voltage or a reference voltage (e.g. ground) to one or more of the collector electrodes 114. The charging voltage may be in the range of substantially 5-15 kV, preferably, substantially 6-10 kV. The charging circuit 140 is connectable to one or more power sources 150 which may include a device power source 150d and/or a vehicle power source 150v (e.g. vehicle's power system), depending on the degree of integration with the vehicle and allowing the device 100 to be retrofitted.

In an embodiment where the device 100 is retro-fittable to the vehicle, the device 100 comprises a dynamo generator 150*d* configured to generate electrical power in response to rotary motion of the tyre T or wheel W of the vehicle V, as is known in the art. The dynamo generator 150*d* has a rotatable driving element configured to frictionally engage the tyre T or wheel W (e.g. the rim of the wheel) so as to rotate therewith. In this way, the charging circuit 140 and the charging can be responsive to the motion of the vehicle. A battery may be also provided to store (at least temporarily) the power generated by the dynamo 150*d* (not shown).

The voltage output from a vehicle power source such as a car battery or a dynamo may approximately 12V. The charging circuit 140 may comprise any electrical components known in the art to convert the power output from the power source(s) 150 into the required charging voltage. In an embodiment, a DC-to-DC voltage converter or amplifier is used to step up the voltage to the kV range suitable for charging the collector electrodes, while reducing the current to less than 2 mA. Optionally, a full wave bridge rectifier may be used to convert the AC voltage output from the dynamo 150*d* into a DC voltage before stepping up.

In an embodiment, the charging circuit 140 applies a positive voltage to alternate collector electrodes 114 and a negative voltage to the remaining collector electrodes 114, or vice versa. An alternating charge polarity provides a uniform electric field between the collector electrodes 114. The charging circuit 140 can operate in multiple modes. In an example, the charging modes include a first mode in which the collector electrodes 114 are alternately charged with a constant positive and negative charging voltage, or a positive/negative and a neutral voltage, a second mode in which the collector electrodes are all neutrally charged, and a third mode in which the polarity of the charging voltage on each collector electrodes 114 is periodically reversed. Reversal of the charge polarity in the third mode repels charged particulates previously collected at the electrodes 114 to help clean or reduce build-up of charged particulates on the electrodes which may otherwise reduce the collection efficiency.

In some embodiments, the charging circuit 140 comprises one or more capacitors or supercapacitors configured to store charge discharged by the collector electrodes 114. The stored charge can then be re-used to re-charge the collector electrodes 114 in order to reduce power consumption.

The device 100 may comprise a control module 160 connectable to the charging circuit 140 to selectively activate and deactivate the filter unit 110, i.e. charging of the collector electrodes 114. For example, the charging circuit 140 may comprise one or more control switches (e.g. relays, high power transistors or the like) to control the output of the charging circuit 140 (e.g. connect and disconnect the collector electrodes 114 from the charging circuit 140), and the control module 160 controls the one or more switches (not shown).

Particulates are generated primarily when the vehicle V is accelerating, braking and cornering. As such, in an embodiment, the control module 160 is configured to selectively activate the filter unit 110 in response to one or more detected driving conditions including acceleration, braking, and/or cornering of the vehicle. Further, as the device 100 may be less effective in wet conditions, the control module 160 may be configured to deactivate the filter unit 110 in response to detected wet driving surface conditions.

Most modern vehicles, particularly powered vehicles such as automobiles and airplanes, have sophisticated on-board electronic control systems (e.g. an electronic control unit or ECU) that control and monitor various vehicle functions and parameters, and include numerous sensors that detect driving conditions such as acceleration, braking, cornering, temperature, rain, humidity etc. In an embodiment, the control module 160 is connectable to the vehicle's ECU to receive driving data indicative of one or more detected driving conditions, and control the charging circuit 140 in response to the driving data received.

Alternatively or additionally, the device 100 may comprise one or more sensors 170 to detect one or more driving conditions and provide said driving data to the control module 160. The sensors 170 may include one or more of an inertial measurement unit (IMU), an accelerometer, and one or more environmental sensors for detecting temperature, wetness, humidity, ozone levels (as ozone may be produced in the vicinity of the collector electrodes 114 through ionisation of the air). A proximity sensor may also be provided for monitoring the distance of the device 100 from the tyre T or wheel W or driving surface S. A proximity sensor may also be used to determine tyre T or wheel W wear. A means for measuring the weight of the filter unit 110 may also be provided, e.g. a load cell, to monitor collection of particulates on the electrodes 114 or in the receptacle 140.

The control module 160 may cause the charging circuit 140 to switch between different charging modes. For example, when control module 160 receives signals from sensors 170 to indicate that the vehicle is moving at a constant speed (meaning fewer tyre particulates are being produced), the control module 160 may cause the charging circuit 170 to operate in the second charging mode in order to reduce power consumption. Further, sensors 170 may send signals indicating that the vehicle is accelerating or braking to the control module 160 and the control module 160 may, in response, cause the charging circuit 140 to operate in a first charging mode to increase particulate capture efficiency.

Figure 17A:
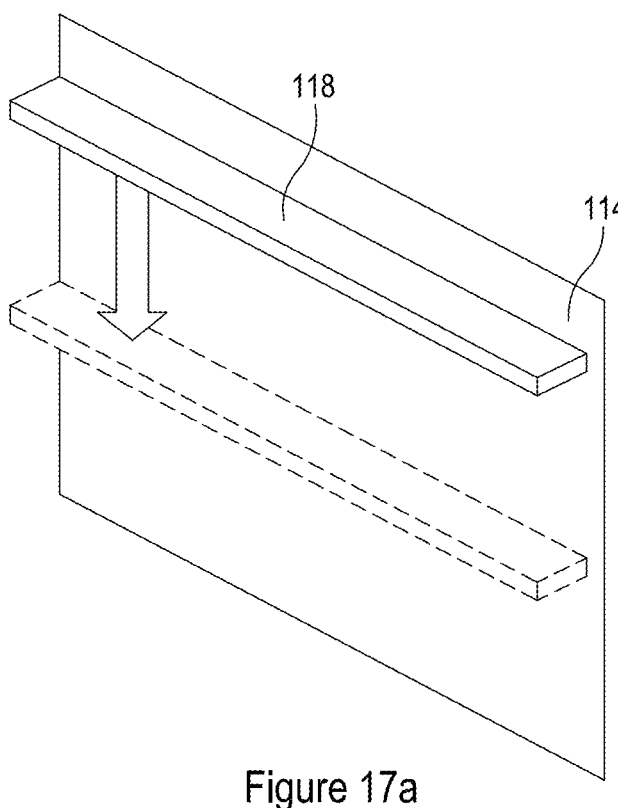
FIGS. 17(*a*) and 17(*b*) show a mechanical cleaning means for a collector electrode.
Figure 17B:
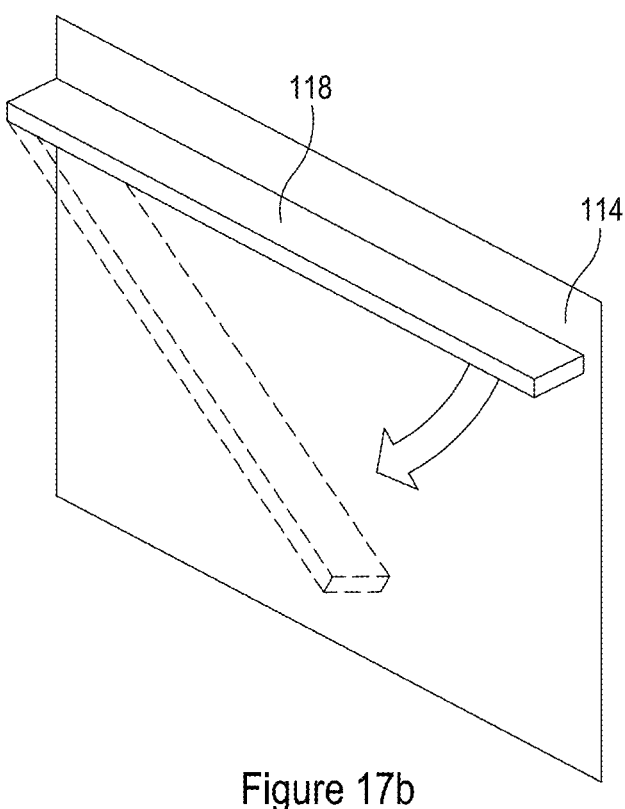

As the collected particulates build up on the collector electrodes 114 over time the collection efficiency may decrease. In an embodiment, the filter unit 110 comprises a means for cleaning and/or removing collected particulates from the collector electrodes 114 and a receptacle 130 for storing collected particulates that are removed or cleaned from the collector electrodes 114. The receptacle 130 is mounted in a position to receive the collected particulates removed/directed by the cleaning means. The cleaning means may be mechanical, such as one or more mechanical vibrators that transfer a mechanical vibration to the collector electrodes 114 (not shown). Alternatively or additionally, the mechanical means may comprise one or more moveable cleaning members 118 (e.g. wiping blades or brushes) that move over or across a surface of the or each collector electrode 114 to remove or clean collected particulates from the collector electrodes 114 as shown in FIGS. 17(*a*) and 17(*b*) where the cleaning member 118 moves from a first position (solid outline) to a second position (dashed outline) in the direction of the arrow. The moveable cleaning member(s) and/or mechanical vibrator(s) may be driven by one or more actuators or motors (not shown) powered by the charging circuit 140 and optionally controlled by the control module 160. For example, the cleaning means may be activated when the collector electrodes 114 are not activated. Alternatively, the filter unit 110 may be configured to receive and use a clean airflow to blow the collected particulates off the collector electrodes 114 towards the receptacle 130. The different cleaning means may be used separately or in combination.

The control module 160 may cause the charging circuit 140 to operate in a third charging mode to assist with cleaning the collector electrodes 114, e.g. in response to signals received from one or more sensors 170 indicating particulate build-up on the collector electrodes 114.

Figure 11:
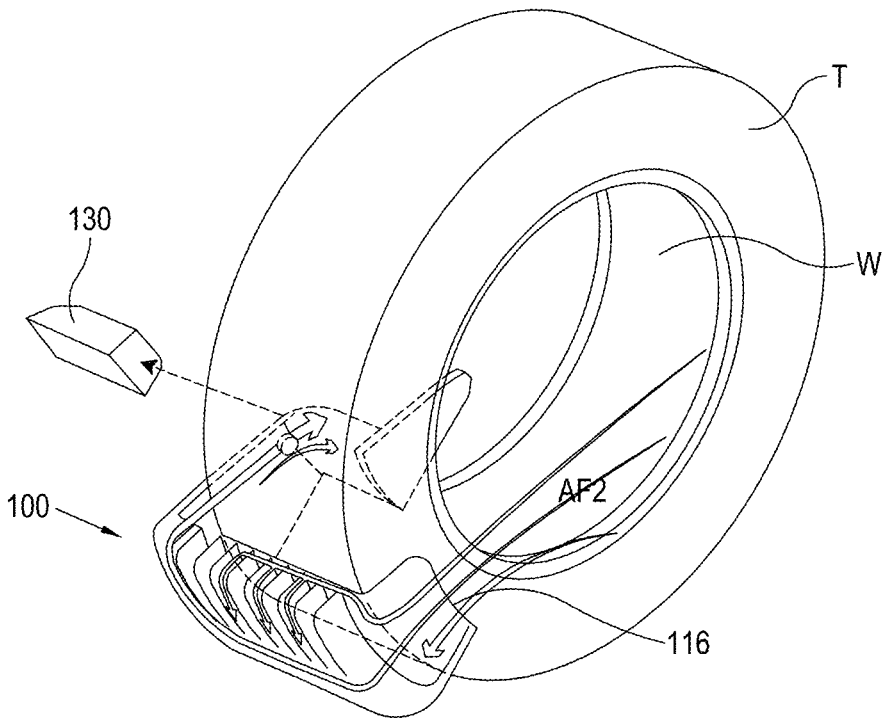
FIG. 11 illustrates an airflow through the device of FIG. 8 for cleaning the collector electrodes.

FIG. 11 shows an embodiment of the device 100 with an air-cleaning means. The filter unit 110 comprises an inlet conduit 116 in fluid communication with the filter cavity 112 for receiving a substantially clean airflow AF2 from around the tyre T or wheel W and directing the clean airflow AF2 over and/or past the collector electrodes 114 to remove or clean collected particulates from the collector electrodes 114 (see also FIG. 8). A removable receptacle 130 is in fluid communication with (and positioned downstream of) the filter cavity 112 for storing collected particulates removed from the collector electrodes 114 by the clean airflow AF2, as shown. Air-cleaning may be effective when the collector electrodes 114 are not charged. The clean airflow AF2 may be received continuously when the vehicle is in motion. Alternatively, the filter unit 110 may comprise an inlet valve (not shown) in or adjacent to the inlet conduit 116 to selectively inhibit the clean airflow AF2 from entering the filter cavity 112, e.g. when the collector electrodes 114 are charged. The inlet valve may be controlled by the control module 160.

By way of an example, the average UK car drives 12,411 km per year, producing approximately 130 mg of tyre particulates per km, and a total mass of about 1.613 kg per year. Taking an approximate density of uncompacted tyre particulates of 410 kg/m$^3$, this translates to a total volume of approximately 3900 cm$^3$. With a collection efficiency of 60%, a receptacle 130 that can hold a volume of 213.5 cm$^3$ (i.e. with dimensions of approximately 6×6×6 cm) would require changing or emptying approximately once every month.

FIGS. 13(*a*) and 13(*b*) illustrate a two-stage particulate collection device 100 which includes a charging stage and a collection stage. The collection stage is the same as the filter unit 110 previously described. The charging stage may take the form of a corona discharge grid 180 placed upstream of the collector electrodes 114, e.g. across the inlet opening 112*a* of the filter cavity 112. The grid 180 may comprise a conductive mesh or a plurality of conductive wires. The corona discharge grid 180 is connected to the charging circuit 140 and charged with a large negative or positive voltage (typically at least twice that of the collection electrodes 114) to ionise the air surrounding the grid 180 and transfer a negative or positive charge to the particulates as they pass through the grid 180, as illustrated.

Figure 14:
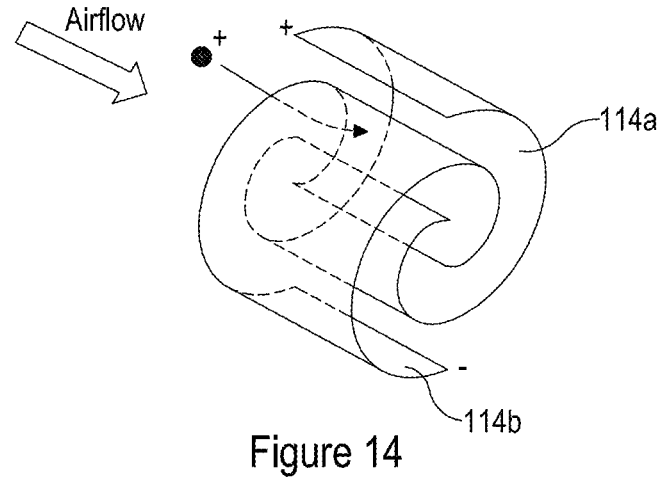
FIG. 14 shows an alternative collector electrode arrangement for a particulate collecting device.
Figure 15A:
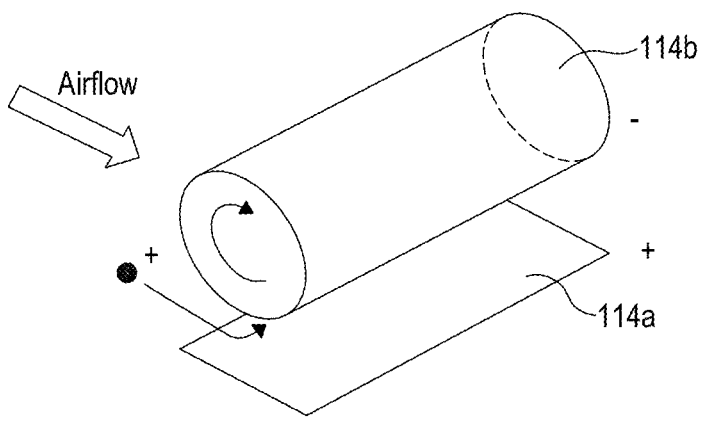
FIGS. 15(*a*) and 15(*b*) show another alternative collector electrode arrangement for a particulate collecting device.
Figure 15B:
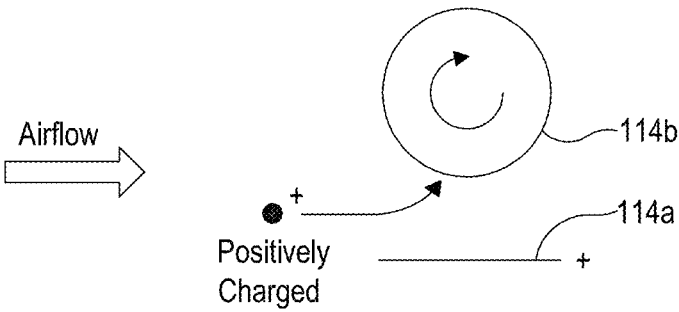
Figure 16A:
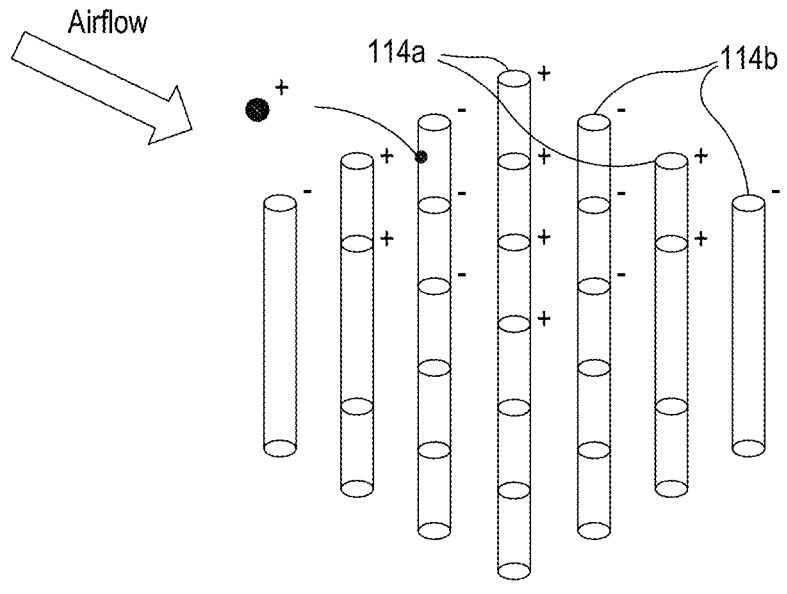
FIGS. 16(*a*) and 16(*b*) show another alternative collector electrode arrangement a particulate collecting device.
Figure 16B:
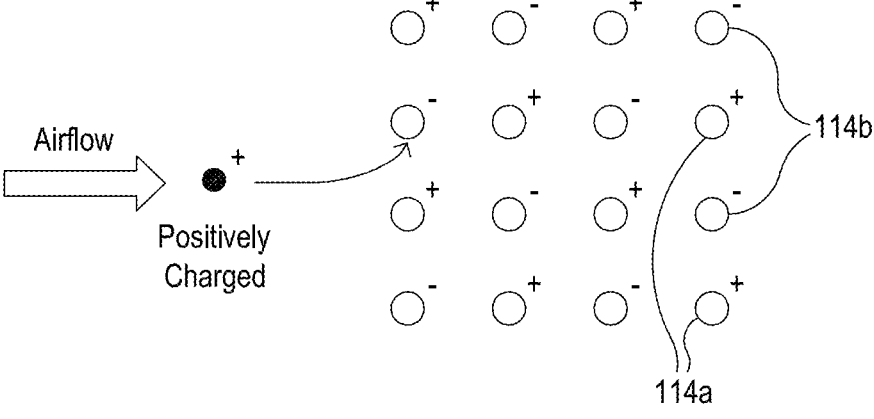

FIGS. 14, 15(*a*), 15(*b*), 16(*a*) and 16(*b*) show alternative collector electrode arrangements comprising one or more curved or non-planar collector electrodes 114 that aim to maximise the surface area to volume ratio of the electrodes for particulate collection. FIG. 14 shows two spiral-shaped electrodes 114*a*, 114*b* that are arranged substantially parallel to the airflow AF1 and with a substantially constant separation. A suitable cleaning method is airflow-based as described above. FIGS. 15(*a*) and 15(*b*) show an arrangement comprising a rotatable collector electrode 114*a* and a fixed collector electrode 114*b*. In this case, the rotatable electrode 114 is negatively charged so as to collect positively charged particulates on its surface as it rotates. A suitable cleaning method is airflow-based or mechanical (see above). FIGS. 16(*a*) and 16(*b*) show an arrangement comprising an array of rod-like collector electrodes 114*a*, 114*b* that are alternately charged and grounded or alternately charged with a with a positive and negative charge. This array is shown as a square array, but it will be appreciated that the array can take any geometric shape, such as a rectangular array, triangular array, hexagonal array etc. A suitable cleaning method is airflow-based or mechanical (see above). The collector electrodes 114 may be substantially flexible to aid cleaning/removal of collected particulates by mechanical means. Alternatively or additionally, the whole array can be removable or replaced.

Figure 18A:
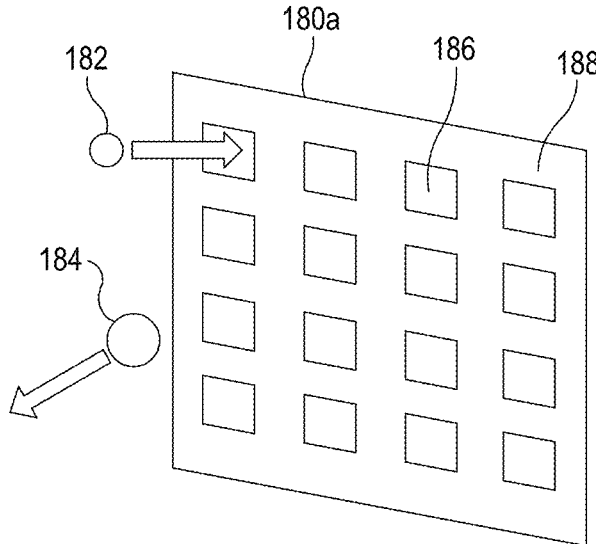
FIGS. 18(*a*) and 18(*b*) show examples of a mesh.

FIGS. 18(*a*) and 18(*b*) show examples of filter meshes 180*a*, 180*b* which can be included within a particulate collecting device 100. The filter mesh 180*a*, 180*b* prevents debris such as gravel entering the electrostatic filter unit 110. The filter mesh 180*a*, 180*b* is positioned upstream of the collector electrodes 114, e.g. at the inlet opening or between the inlet opening and the collection stage. The filter meshes 180*a*, 180*b* may be or comprise the grid 180 of FIGS. 13(*a*) and 13(*b*).

The filter meshes 180*a*, 180*b* comprise a plurality of apertures 186. The apertures 186 are larger than an average tyre particle 182, but are smaller than an average debris particle 184, such as gravel, grit, dirt etc. For example, the apertures 186 may have a size/width in the range of substantially between 1 to 10 mm. This enables tyre particles 182 to pass through the mesh 180*a* but prevents larger debris particles from passing through the mesh 180*a*, 180*b* and into the collection stage. In the example of FIG. 18(*a*), the apertures 186 may be formed in a base sheet 188. In FIG. 18(*b*), the mesh 180*b* comprises a wire mesh.

Figure 18B:
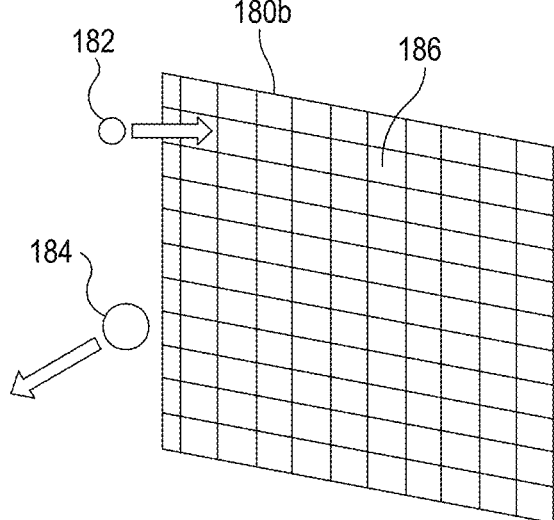
Figure 19:
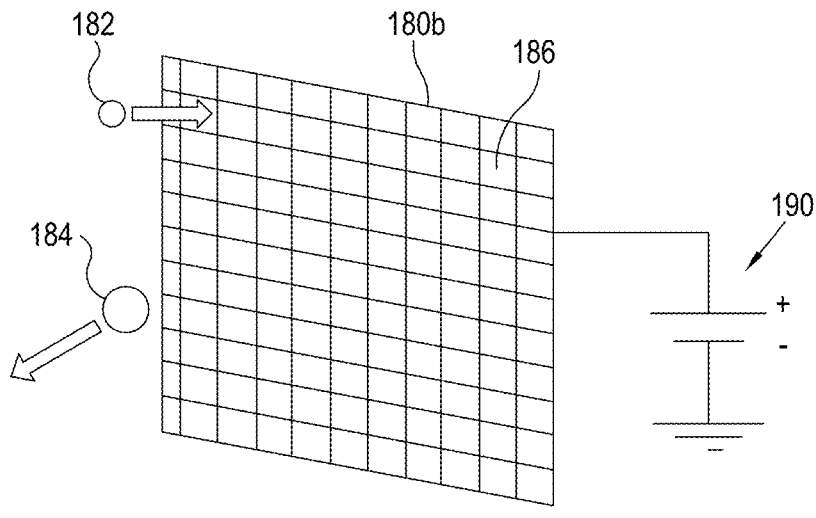
FIG. 19 shows a mesh which also acts as a charging stage.

In FIG. 19, the wire mesh 180*b* of FIG. 18*b* is connected to the charging circuit 140 for receiving a DC charging voltage. In this embodiment, the mesh 180*b* is chargeable and further acts as a charging stage to charge the tyre particulates 182.

Figure 20:
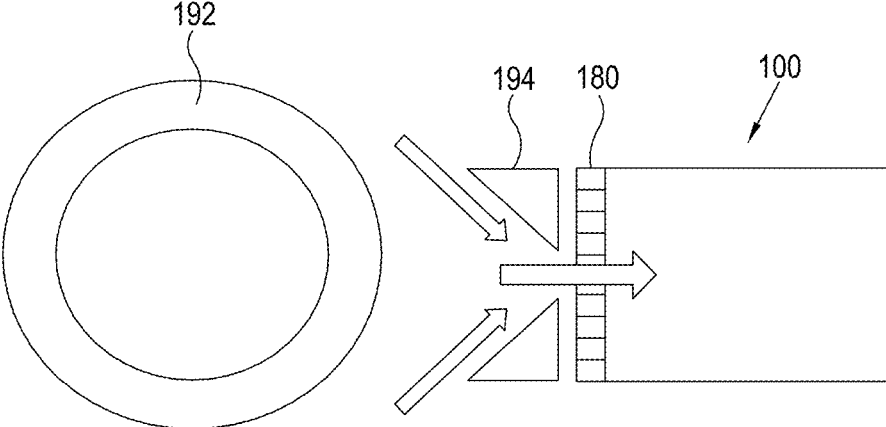
FIG. 20 shows how a device inlet and mesh create a low-pressure region.

FIG. 20 shows a device 100 positioned behind a wheel 192 of a vehicle. In the figure, the wheel 192 is moving from right to left. The device 100 comprises an inlet 194 and a mesh 180. Other components of the device 100 are omitted for clarity.

The inlet 194 comprises a nozzle portion with a tapered opening width configured to redirect air coming from the wheel 192 into a smaller region. Redirecting the air (as indicated by the arrows) creates a region of low-pressure and high velocity within the device 100. The mesh 180 helps to create a region of even lower pressure immediately within the device 100. Creating a region of low-pressure helps to entrain more particulates in the inlet airflow, and hence allows more tyre particulates to be captured by the device 100. In other embodiments, the inlet 194 may be larger than the rest of the device 100. Having a larger inlet 194 enables more air coming from the wheel 192 to be redirected into the device 100.

Figure 21:
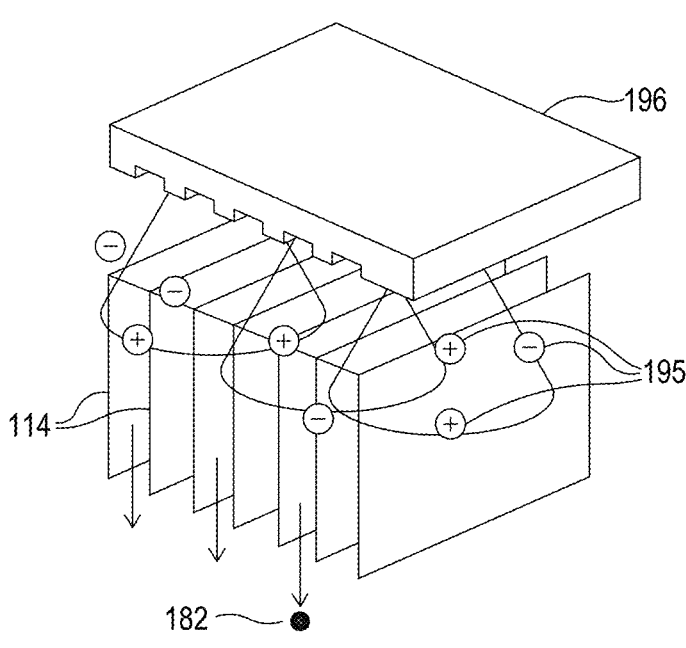
FIG. 21 shows how an ionising jet can be used to clean the collector electrodes in accordance with some embodiments.

In an embodiment, the device 100 comprises an ion generator 196 for producing an ionising jet in the vicinity of the collector electrodes 114 for removing charged tyre particulates 182 from collector electrodes 114, as shown schematically in FIG. 21. The ionising jet comprises a large number of charged ions 195 (both positive and negative) that neutralise charged particulates 182 on collector electrodes 114 and thereby remove any attractive forces holding them to the electrodes 114.

Figure 22:
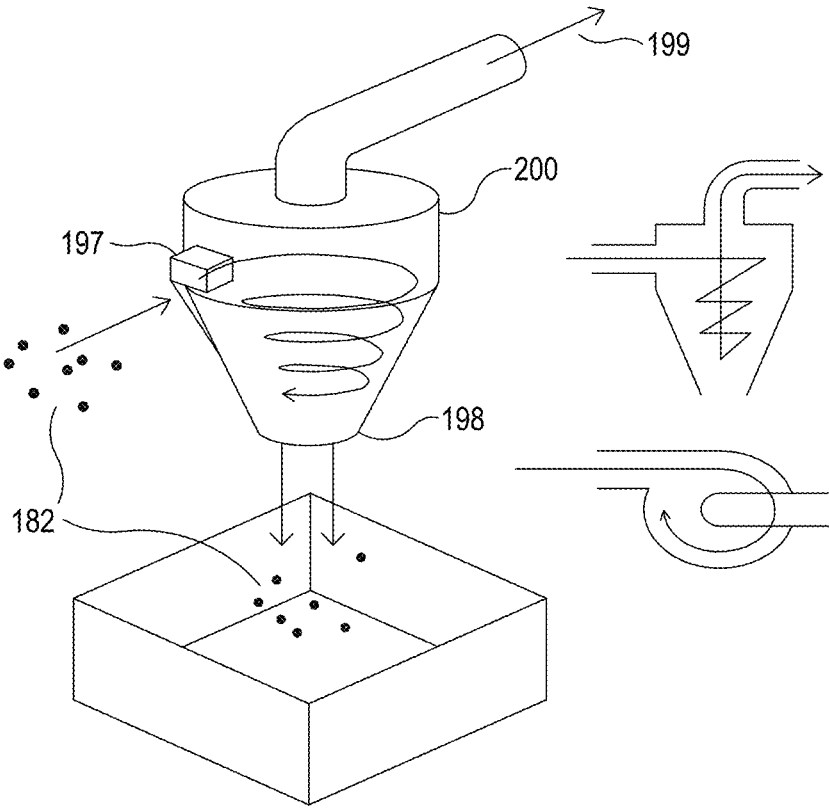
FIG. 22 shows a conical cyclone body for residual particle separation.

FIG. 22 shows a conical cyclone body 200 which can be used as part of the device 100 in accordance with some embodiments. The cyclone body 200 is located downstream of the collection electrodes 114 and is configured to remove any residual particulates (charged tyre particulates or otherwise) in the airflow before returning the airflow to the environment. The body 200 comprises an inlet 197 for receiving an airflow containing residual particulates 182 and an outlet 199 for outputting a substantially "clean" airflow containing a reduced concentration of residual particulates.

The conical cyclone body 200 is configured to separate residual particulates 182 from the airflow using cyclonic separation. The particulates 182 are separated from the airflow and exit the cyclone body 200 via a waste outlet 198, e.g. to a storage unit. The remaining "clean" airflow returns to the freestream via an outlet 199. Allowing filtered air to return to the freestream reduces turbulence and therefore reduce the drag force exerted on the vehicle.

Figure 23A:
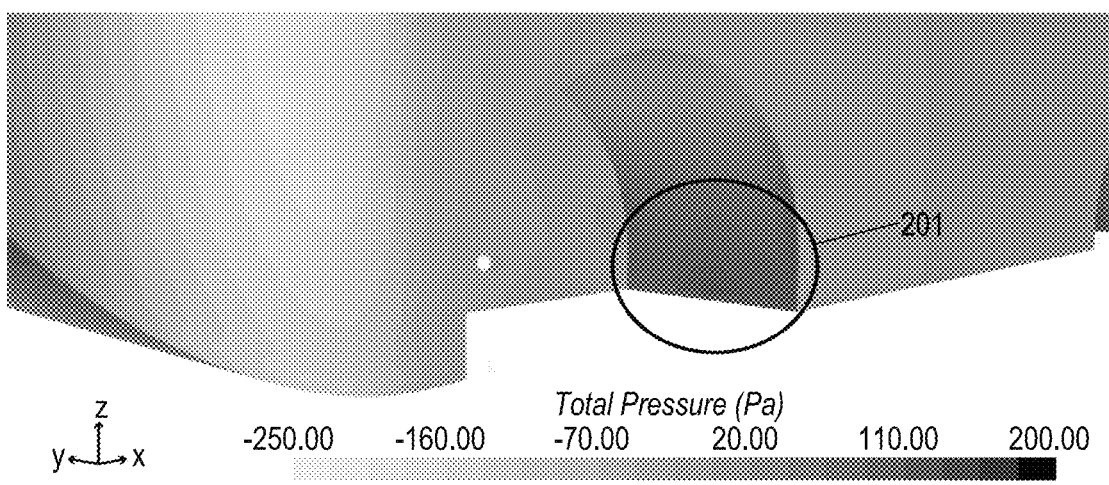
FIGS. 23*a* to 23*d* shows simulations of pressure and air velocity around a moving vehicle.
Figure 23B:
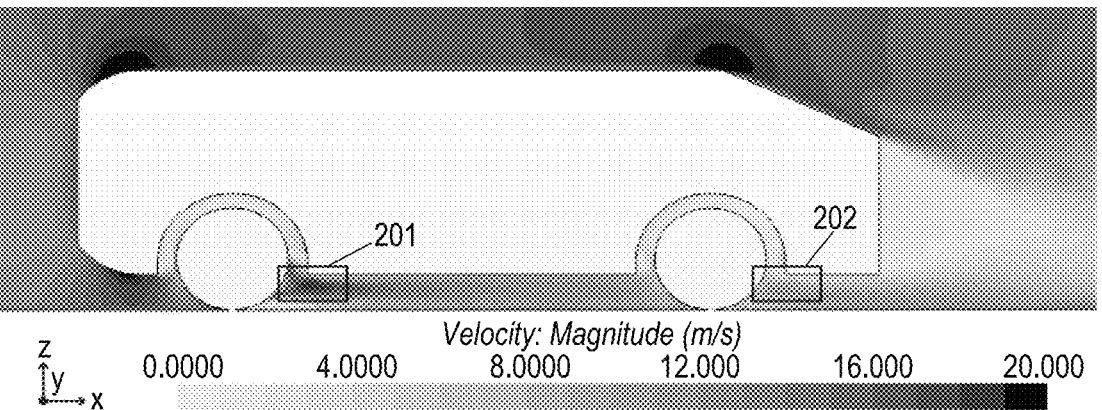
Figure 23C:
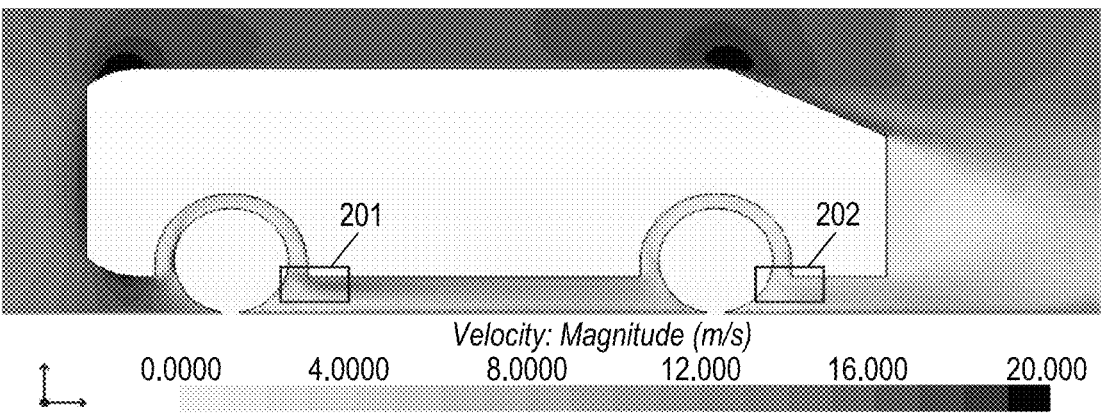
Figure 23D:
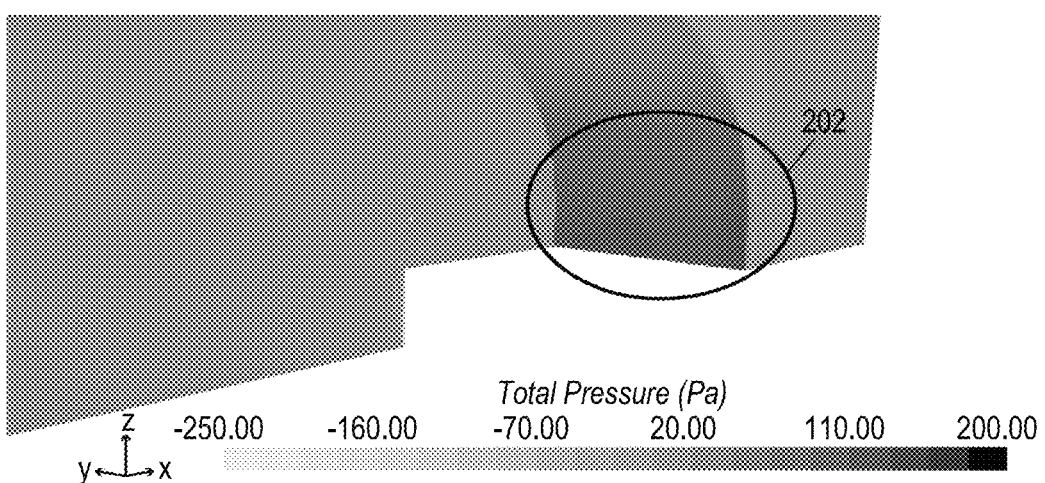

In order to determine the optimum device position, aerodynamic studies were performed using a computational model equipped with a moving floor and rotating wheels. Within these simulations, the device 100 may be positioned towards the back portion of the wheel liner, working as an extension of the current liner, to capture charged particulates. The results of these simulations are shown in FIGS. 23*a*-23*d*. FIGS. 23*a* and 23*d* show the distribution of total pressure values in the front and back wheel liners, providing evidence of high velocity and low pressure flow carrying the tyre particulates. FIGS. 23*b* and 23*c* shows the magnitude of the airflow velocity around a car. FIG. 23*b* shows the magnitude of the airflow velocity on the inside surface of the tyre (closest to the vehicle centreline). FIG. 23*c* shows the magnitude of the airflow velocity along the centreline of the tyre.

The regions marked 201 and 202 are at the back of the wheel arches, as described above. The simulation results show that the highest values of surface pressure and airflow velocity inside the wheel arch is found at these regions 201, 202, which is desirable for the collection of tyre particulates.

In FIG. 23*b*, the highlighted regions on the inside face are higher velocity than the wheel mid-point. This demonstrates a positive velocity gradient towards the inside face of the tyre. In FIG. 23*c*, there is a high velocity region positioned behind the front tyre. The airflow towards the inner face of the wheels (nearest the centre line of the vehicle) encounters airflow at higher velocity and lower pressure. The device may be designed in such a way to capture a higher number of particulates in this region.

Figure 24:
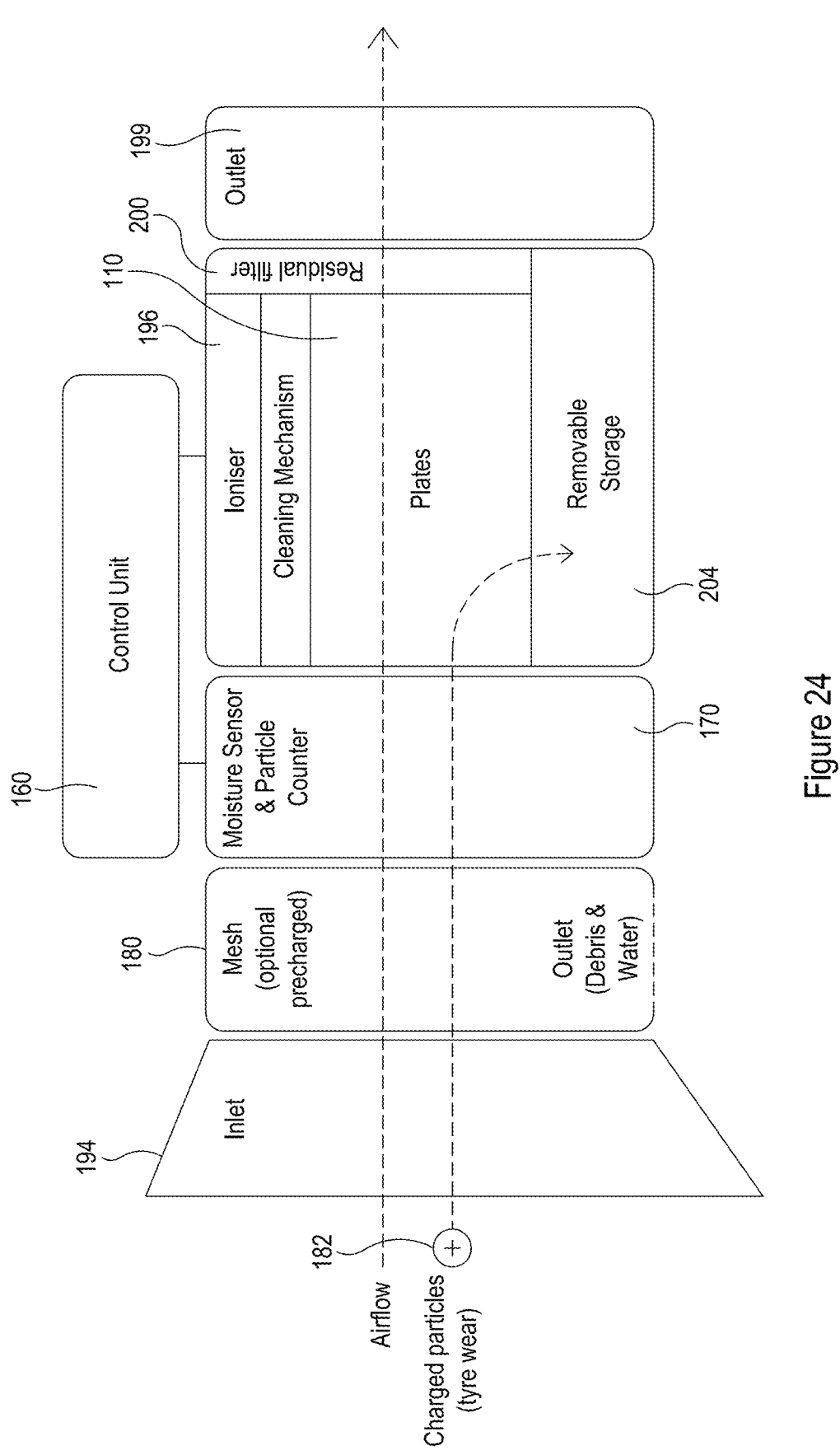
FIG. 24 shows a tyre particulate collecting device in accordance with one embodiment.

FIG. 24 shows a tyre particulate device 100 in accordance with an embodiment. The components described in relation to this embodiment can be the components described earlier in the description. The device 100 comprises an inlet 194 in the form of a nozzle with a tapered opening width configured to receive airflow comprising tyre particulates 182, an electrostatic filer unit 110 for collecting charged tyre particulates, and an outlet 199 for returning substantially "cleaned" air to the freestream. A filter mesh 180 is provided between the inlet 184 and the filter unit 110 to prevent debris such as gravel and dirt entering device 100. The filter mesh 180 may additionally be formed of or comprise a conductive material and function as a pre-charging mesh configured to charge incoming tyre particulates 182. In this case the filter mesh 180 is connected to the charging circuit 140 to receive a charging voltage. In other embodiments, two separate meshes may be used instead of a single mesh 180.

Device 100 further comprises a removable storage unit 204 configured to receive captured tyre particulates 182 from electrostatic filter unit 110. Removable storage unit 204 may be removed from the device 100 in order to dispose of, or recycle, the captured tyre particulates 182. The device 100 further comprises an ion generator device 196 configured to provide a jet of ions, as described above. In this example, tyre particulates 182 fall into the removable storage unit 204 after being removed from the collector electrodes 114 by the ion jet. The device 100 also comprises a control module 160, and sensors 170 in communication with the control module 160, as described above. The device 100 also comprises a mechanical cleaning mechanism such as an ultrasonic vibrator, and a residual air filter device 200 positioned between the filter unit 110 and the outlet 199 such as an air filter or cyclone body described above.

Figure 25:
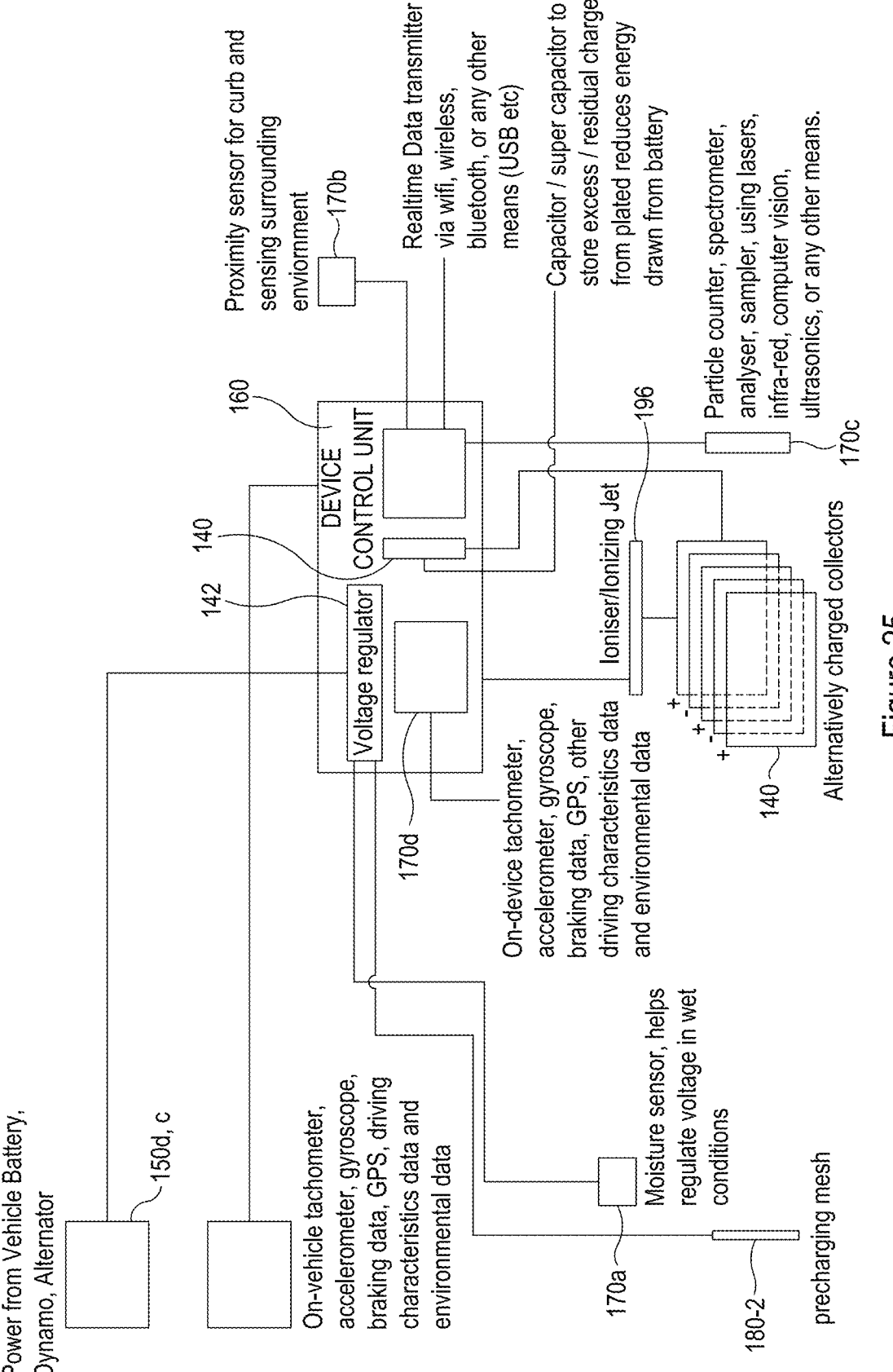
FIG. 25 shows another control system for operating a particulate collecting device.

FIG. 25 show a schematic diagram of another example control system 2000 for operating the device 100. Parts of the system 2000 may be located in or on the device 100 and other parts may be located in or on the vehicle V. The device 100 comprises collector electrodes 114, a charging circuit 140 for charging the collector electrodes 114, a control module 160, an ion generator 196, a pre-charging mesh 180-2, a voltage regulator 142 for powering the pre-charge mesh 180-2, and a plurality of sensors 170 in communication with the control module 160.

The sensors 170 include a moisture sensor 170*a*, accelerometer 170*d*, and a proximity sensor 170*b*. The proximity sensor 170*b* is configured to detect the proximity of the device 100 to an external object, such as a curb. The control module 160 receive signals from the proximity sensor and send signals to the vehicle ECU to alert the driver of the proximity of the device 100 to the external object and avoid collisions between the device and external objects.

The sensors 170 also include one or more particle sensors 170*c* configured to measure the number or amount of particles collected and output measurement data to the control module. The particle sensors 170*c* may be or comprise a particle counter, particle analyser, and/or a spectrometer that provide optical measurements of particle properties using infra-red light, as is known in the art. In this example, the control module 160 is configured to determine and monitor a particulate collection efficiency based on one or more signals from the particle sensors 170*c* and control the charging circuit 140 to adjust the charging voltage applied to the collector electrodes 114 in response to detection of a collection efficiency below a predetermined value.

From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination.

For the sake of completeness it is also stated that the term "comprising" does not exclude other elements or steps, the term "a" or "an" does not exclude a plurality, and any reference signs in the claims shall not be construed as limiting the scope of the claims.

The invention claimed is:

1. A particulate collecting device configured to attach to a vehicle and collect or capture particulates that are released from a tyre or a wheel of the vehicle through wear on or against a driving surface when the vehicle is driven on the driving surface, comprising:

an electrostatic filter unit for collecting or capturing the
particulates in a flow by electrostatic attraction, the
electrostatic filter unit mountable in an operative posi-
tion for receiving a flow of particulates from a contact
point between the tyre or wheel and the driving surface,
the electrostatic filter unit comprising one or more
electrostatically chargeable collector electrodes to
attract charged particulates in the flow when the one or
more collector electrodes are charged;
a charging circuit connected to the one or more collector
electrodes for electrostatically charging the one or more
collector electrodes; and
a control module connectable to the charging circuit to
selectively activate and deactivate charging of the one
or more collector electrodes in response to one or more
detected driving conditions;
wherein the operative position is such that:
i) the electrostatic filter unit is positioned in close
proximity to a radially outer surface of the tyre,
and/or to a contact point or contact area between the
tyre and the driving surface;
ii) the electrostatic filter unit receives an airflow around
and/or downstream of the tyre containing said par-
ticulates entrained therein; and
iii) the operative position is on an underside of the
vehicle and/or behind the wheel.
2. The device of claim 1, comprising an attachment
portion configured to attach the device to the vehicle and
mount the electrostatic filter unit in the operative position,
and
wherein the attachment portion is configured to attach the
device to the vehicle at a mounting point such that:
the operative position of the electrostatic filter unit is
substantially fixed axially and radially relative to the
tyre or wheel such that the electrostatic filter unit is able
to move with the tyre or wheel of the vehicle whilst
maintaining the operative position; or
the operative position of the electrostatic filter unit is not
substantially fixed relative to the tyre or wheel.
3. The device of claim 1, comprising an attachment
portion configured to attach the device to the vehicle and
mount the electrostatic filter unit in the operative position,
wherein the attachment portion is substantially flexible
and/or comprises one or more flexible portions or joints.
4. The device of claim 1, wherein the electrostatic filter
unit comprises a filter cavity, the filter cavity housing the one
or more collector electrodes and having an inlet opening
configured to face, at least in part, the tyre or wheel when in
the operative position for receiving the flow of particulates.
5. The device of claim 1, wherein the electrostatic filter
unit comprises a cleaning means for removing or cleaning
collected particulates from the one or more collector elec-
trodes.
6. The device of claim 5, wherein the electrostatic filter
unit comprises a filter cavity, the filter cavity housing the one
or more collector electrodes and having an inlet opening
configured to face, at least in part, the tyre or wheel when in
the operative position for receiving the flow of particulates,
and wherein the cleaning means comprises one or more of:
an inlet conduit in fluid communication with the filter
cavity for receiving a substantially clean airflow and
directing the clean airflow over and/or past the one or
more collector electrodes to remove or clean collected
particulates from the one or more collector electrodes;
one or more mechanical vibrators configured to transfer a
mechanical vibration to each of the one or more collector electrodes to remove or clean collected particu-
lates from the one or more collector electrodes; and
one or more moveable cleaning members configured to
move over or across a surface of each collector elec-
trode to remove or clean collected particulates from the
one or more collector electrodes.
7. The device of claim 1, wherein the one or more
collector electrodes comprise an array of the one or more
collector electrodes arranged substantially perpendicular or
parallel to the flow.
8. The device of claim 1, wherein each of the one or more
collector electrodes comprises one or more of:
a plate-shaped element arranged substantially vertically
when in the operative position;
a surface coating configured to improve durability;
a thin insulating surface coating configured to prevent
electrical contact between the tyre or wheel particulates
and a respective collector electrode; and
a hydrophobic surface coating.
9. The device of claim 7, wherein the charging circuit is
configured to do one or more of:
apply a charging voltage to alternate one or more collector
electrodes in the array and apply a reference voltage to
the rest of the one or more collector electrodes in the
array, or vice versa;
apply a charging voltage to the one or more collector
electrodes in the array and apply an opposite charging
voltage to the rest of the collector electrodes in the
array, or vice versa; and
periodically reverse the polarity of the charging voltage
on each of the one or more collector electrodes.
10. The device of claim 9, wherein the charging circuit is
connectable to a power source, and wherein:
the power source is a power source of the vehicle; and/or
the charging circuit comprises a power source.
11. The device of claim 9, further comprising one or more
of:
i) the one or more driving conditions include one or more
of acceleration, braking, cornering, and/or a driving
surface condition;
ii) the control module is connectable to a vehicle elec-
tronic control unit (ECU) for receiving driving data
indicative of the one or more detected driving condi-
tions; and
iii) the device comprises one or more sensors for detecting
the one or more driving conditions and providing
driving data to the control module.
12. The device of claim 1, wherein the device comprises
a mesh configured to inhibit particulates greater than a
threshold size from entering the device, and wherein the
mesh is:
configured to create a low-pressure cavity within the
device around the one or more collector electrodes;
and/or
wherein the mesh is formed of or comprises a conductive
material, and the device comprises a charging circuit
configured to apply a DC charging voltage to the mesh
to act as a charging stage for charging tyre or wheel
particulates.
13. The device of claim 1, wherein the device is config-
ured to separate charged tyre or wheel particulates from an
incoming airflow and direct the charged tyre or wheel
particulates into specific regions within the device.
14. The device of claim 1, wherein the device further
comprises an outlet configured to allow an airflow passing
through the electrostatic filter unit to exit the device, and a
particulate separation means positioned between the electrostatic filter unit and the outlet, the particulate separation means configured to separate remaining particulates from the airflow using cyclonic separation, or centrifugal separation.

15. The device of claim 1, wherein the device comprises an inlet opening for receiving the flow of particulates, wherein the inlet opening comprises a nozzle portion with a tapered width.

16. A vehicle comprising the particulate collecting device of claim 1 attached to the vehicle in close proximity to a tyre or wheel of the vehicle for capturing particulates that are released from the tyre or wheel through wear on or against a driving surface when the vehicle is driven on the driving surface.

17. A method of collecting or capturing particulates that are released from the tyre or the wheel of the vehicle . . . the driving surface when the vehicle is moving using a particulate collecting device according to claim 1, comprising:

receiving, at the electrostatic filter unit mounted in the operative position, the airflow around the tyre or wheel containing said particulates from the contact point between the tyre or wheel and the driving surface entrained therein; and collecting or capturing the particulates in the flow by electrostatic attraction by charging at least one of the one or more collectors electrodes of the electrostatic filter unit to attract the particulates in the flow to the at least one of the one or more collector electrodes; and without pre-charging the particulates.

18. The method of claim 17, further comprising:

cleaning or removing collected or captured particulates from the one or more collector electrodes using a cleaning means of the device; and storing, in a receptacle of the device, collected particulates removed from the one or more collector electrodes by the cleaning means; and wherein cleaning the device comprises one or more of: reversing the polarity of the collector electrodes, and using an ion jet to neutralise the captured particulates.

19. The method of claim 18, further comprising: receiving driving data indicative of the one or more detected driving conditions, and charging the at least one of the one or more collectors electrodes in response to one or more detected driving conditions.

\* \* \* \* \*